(12) United States Patent
Zhao et al.

(10) Patent No.: US 10,897,579 B2
(45) Date of Patent: Jan. 19, 2021

(54) PHOTOGRAPHING METHOD AND APPARATUS

(71) Applicant: Huawei Technologies Co., Ltd., Shenzhen (CN)

(72) Inventors: Yun Zhao, Shenzhen (CN); Yining Huang, Hangzhou (CN); Xi Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/429,748

(22) Filed: Jun. 3, 2019

(65) Prior Publication Data
US 2019/0289187 A1 Sep. 19, 2019

Related U.S. Application Data

(63) Continuation of application No. 15/858,248, filed on Dec. 29, 2017, now Pat. No. 10,326,946, which is a (Continued)

(30) Foreign Application Priority Data

Jun. 30, 2015 (CN) .......................... 2015 1 0374860

(51) Int. Cl.
*H04N 5/235* (2006.01)
*H04N 5/262* (2006.01)
*H04N 5/232* (2006.01)

(52) U.S. Cl.
CPC ........... *H04N 5/2353* (2013.01); *H04N 5/232* (2013.01); *H04N 5/2352* (2013.01);
(Continued)

(58) Field of Classification Search
CPC .. H04N 5/2353; H04N 5/2355; H04N 5/2621; H04N 5/2352; H04N 5/2356; H04N 5/232; H04N 5/2354; H04N 5/77
(Continued)

(56) References Cited

U.S. PATENT DOCUMENTS 8,594,423 B1 11/2013 Carpenter
2008/0158410 A1 7/2008 Lin
(Continued)

FOREIGN PATENT DOCUMENTS

CN 1916749 A 2/2007
CN 101322398 A 12/2008
(Continued)

OTHER PUBLICATIONS

Foreign Communication From a Counterpart Application, Korean Application No. 2019-043877375, Korean Notice of Allowance dated Jun. 19, 2019, 2 pages.
(Continued)

*Primary Examiner* — Yogesh K Aggarwal
(74) *Attorney, Agent, or Firm* — Conley Rose, P.C.

(57) ABSTRACT

A photographing method includes entering a slow shutter photographing mode, dividing each frame of image of the photographed object into a light trail region, a background light source region, and a non-light-source region, merging the light trail regions of the frames of images, setting a merged light trail region as a light trail region of a target image, setting the background light source regions of one or more of the frames of images as a background light source region of the target image to avoid overexposure, merging the non-light-source regions of one or more of the frames of images, setting a merged non-light-source region as a non-light-source region of the target image to enhance brightness
(Continued)

of the non-light-source region, and storing the target image after obtaining a photographing instruction.

20 Claims, 5 Drawing Sheets

Related U.S. Application Data continuation of application No. PCT/CN2016/081263, filed on May 6, 2016.

(52) U.S. Cl.
CPC ......... *H04N 5/2355* (2013.01); *H04N 5/2356* (2013.01); *H04N 5/2621* (2013.01)

(58) Field of Classification Search
USPC .......................................... 348/223.1–229.1
See application file for complete search history.

(56) References Cited

U.S. PATENT DOCUMENTS

| | | |
|---|---|---|
| 2008/0231730 A1 | 9/2008 | Tsuruoka |
| 2009/0161756 A1 | 6/2009 | Lin |
| 2010/0265357 A1 | 10/2010 | Liu et al. |
| 2012/0133797 A1 | 5/2012 | Sato et al. |
| 2013/0242121 A1 | 9/2013 | Kashiwagi et al. |
| 2014/0313367 A1* | 10/2014 | Iwasaki ................ H04N 5/2351 348/222.1 |
| 2015/0042847 A1 | 2/2015 | Hohjoh et al. |
| 2015/0229823 A1 | 8/2015 | Yasutomi |
| 2015/0289338 A1 | 10/2015 | Hochman |
| 2016/0086033 A1 | 3/2016 | Molin et al. |
| 2016/0366341 A1 | 12/2016 | Li et al. |
| 2017/0085770 A1 | 3/2017 | Cui et al. |
| 2017/0085808 A1 | 3/2017 | Jiang et al. |
| 2017/0134666 A1 | 5/2017 | Liu |
| 2017/0187941 A1 | 6/2017 | Iwasaki |
| 2017/0208259 A1 | 7/2017 | Liu et al. |
| 2017/0213371 A1 | 7/2017 | Zou et al. |
| 2017/0257561 A1 | 9/2017 | Wei et al. |

FOREIGN PATENT DOCUMENTS

| | | |
|---|---|---|
| CN | 101866092 A | 10/2010 |
| CN | 102487431 A | 6/2012 |
| CN | 103841328 A | 6/2014 |
| CN | 103888683 A | 6/2014 |
| CN | 103905730 A | 7/2014 |
| CN | 104052913 A | 9/2014 |
| CN | 104079833 A | 10/2014 |
| CN | 104104798 A | 10/2014 |
| CN | 104104886 A | 10/2014 |
| CN | 104113700 A | 10/2014 |
| CN | 104134225 A | 11/2014 |
| CN | 104135627 A | 11/2014 |
| CN | 104159035 A | 11/2014 |
| CN | 104202521 A | 12/2014 |
| CN | 104221364 A | 12/2014 |
| CN | 104318542 A | 1/2015 |
| CN | 105072350 A | 11/2015 |
| JP | H11313252 A | 11/1999 |
| JP | 2005117395 A | 4/2005 |
| JP | 2005204196 A | 7/2005 |
| JP | 2008054200 A | 3/2008 |
| JP | 2012119858 A | 6/2012 |
| JP | 2012147379 A | 8/2012 |
| JP | 2013186879 A | 9/2013 |
| JP | 2014212415 A | 11/2014 |
| WO | 2013157662 A1 | 10/2013 |

OTHER PUBLICATIONS

Machine Translation and Abstract of Chinese Publication No. CN1916749, Feb. 21, 2007, 10 pages.
Machine Translation and Abstract of Chinese Publication No. CN104052913, Sep. 17, 2014, 15 pages.
Machine Translation and Abstract of Chinese Publication No. CN104104886, Oct. 15, 2014, 18 pages.
Machine Translation and Abstract of Chinese Publication No. CN104135627, Nov. 5, 2014, 32 pages.
Machine Translation and Abstract of Chinese Publication No. CN104159035, Nov. 19, 2014, 15 pages.
Machine Translation and Abstract of Chinese Publication No. CN104318542, Jan. 28, 2015, 13 pages.
Machine Translation and Abstract of Chinese Publication No. CN105072350, Nov. 18, 2015, 58 pages.
Machine Translation and Abstract of Japanese Publication No. JP2005117395, Apr. 28, 2005, 19 pages.
Machine Translation and Abstract of Japanese Publication No. JP2005204196, Jul. 28, 2005, 48 pages.
Machine Translation and Abstract of Japanese Publication No. JP2008054200, Mar. 6, 2008, 17 pages.
Machine Translation and Abstract of Japanese Publication No. JP2012147379, Aug. 2, 2012, 17 pages.
Machine Translation and Abstract of Japanese Publication No. JPH11313252, Nov. 9, 1999, 9 pages.
Foreign Communication From a Counterpart Application, Chinese Application No. 201510374860.6, Chinese Office Action dated Oct. 11, 2017, 12 pages.
Foreign Communication From a Counterpart Application, Chinese Application No. 201510374860.6, Chinese Search Report dated Sep. 27, 2017, 3 pages.
Foreign Communication From a Counterpart Application, PCT Application No. PCT/CN2016/081263, English Translation of International Search Report dated Jul. 1, 2016, 3 pages.
Foreign Communication From a Counterpart Application, PCT Application No. PCT/CN2016/081263, English Translation of Written Opinion dated Jul. 1, 2016, 8 pages.
Foreign Communication From a Counterpart Application, Chinese Application No. 201510374860.6, Chinese Search Report dated Jun. 12, 2018, 2 pages.
Foreign Communication From a Counterpart Application, Chinese Application No. 201510374860.6, Chinese Office Action dated Jun. 26, 2018, 8 pages.
Foreign Communication From a Counterpart Application, European Application No. 16817028.0, Extended European Search Report dated Jul. 5, 2018, 11 pages.
Foreign Communication From a Counterpart Application, Japanese Application No. 2017-566130, Japanese Notice of Reason of Rejection dated Jan. 17, 2019, 3 pages.
Foreign Communication From a Counterpart Application, Japanese Application No. 2017-566130, English Translation of Japanese Notice of Reason of Rejection dated Jan. 17, 2019, 5 pages.

* cited by examiner

PHOTOGRAPHING METHOD AND APPARATUS

CROSS-REFERENCE TO RELATED APPLICATIONS

This application is a continuation application of U.S. patent application Ser. No. 15/858,248, filed on Dec. 29, 2017, which is a continuation of International Application No. PCT/CN2016/081263 filed on May 6, 2016, which claims priority to Chinese Patent Application No. 201510374860.6 filed on Jun. 30, 2015. All of the aforementioned patent applications are hereby incorporated by reference in their entireties.

TECHNICAL FIELD

The present application relates to the field of electronic communications technologies, and in particular, to a photographing apparatus and method.

BACKGROUND

With the development of image processing technologies and mobile terminal devices, a mobile apparatus is used as a photographing apparatus anywhere at any time, and this has become an important function commonly used in daily life. People take photos using a photographing apparatus to conveniently record wonderful moments and express feelings. Currently, most photographing apparatuses (for example, a desktop computer, a mobile phone, a tablet computer, and a camera) provide photographing functions.

A user wishes that a taken photo can effectively reflect a moving trail of a light source for the user, for example, photographing a light-trail pattern that is formed after a handheld light source is moved, a glimpse of fireworks display that easily disappears, or a silky water effect brought by magnificent waterfalls. Currently, photographing quality of a moving trail of a light source is improved mainly using a slow shutter of a single lens reflex camera mounted on a tripod. However, the single lens reflex camera is expensive and is not easy to carry, and a screen of the single lens reflex camera becomes dark during photographing. In this case, the user needs to have rich photographing experience and needs to manually adjust photographing parameters according to a photographing scenario in order to obtain photos having proper exposure and good sharpness. Therefore, based on a current photographing technology, the user cannot really and effectively take a high-quality photo of a moving trail of a light source, and user experience during a photographing process needs to be improved.

SUMMARY

Embodiments of the present application provide a photographing method and apparatus to resolve a problem that a sharp image that is not overexposed cannot be simply and conveniently taken using various photographing apparatuses for a trail formed after a light source is moved. By means of this solution, a sharp image can be taken simply and conveniently using various photographing apparatus for a trail formed after a light source is moved.

A first aspect provides a photographing method, including entering the slow shutter photographing mode after obtaining an instruction of entering a slow shutter photographing mode, continuously obtaining frames of images of a photographed object, dividing each frame of image of the photographed object into a light trail region, a background light source region, and a non-light-source region according to a first preset brightness value, merging the light trail regions of the frames of images of the photographed object, setting the merged light trail region as a light trail region of a target image, setting the background light source regions of one or more of the frames of images of the photographed object as a background light source region of the target image to avoid overexposure of the background light source region of the target image, merging the non-light-source regions of one or more of the frames of images of the photographed object, setting a merged non-light-source region as a non-light-source region of the target image to enhance brightness of the merged non-light-source region of the target image and avoid overexposure, and storing the target image after obtaining a photographing instruction.

In a first possible implementation of the first aspect, after continuously obtaining frames of images of a photographed object, and before dividing each frame of image of the photographed object into a light trail region, a background light source region, and a non-light-source region according to a first preset brightness value, the method further includes obtaining brightness of the frames of images of the photographed object, obtaining, according to the obtained brightness, a quantity of pixels whose brightness is greater than or equal to a second preset brightness value in an image of the photographed object if a value of a parameter needing to be set in the slow shutter photographing mode is not directly obtained, calculating, according to the quantity of the pixels whose brightness is greater than or equal to the second preset brightness value and a total quantity of pixels in the image of the photographed object, a percentage value of the pixel whose brightness is greater than or equal to the second preset brightness value, and adjusting, when the percentage value is greater than or equal to an upper limit of a preset percentage threshold, the value of the parameter needing to be set in the slow shutter photographing mode to reduce the percentage value such that the reduced percentage value in the image after the photographing is within a range of the preset percentage threshold.

With reference to the first aspect, in a second possible implementation, after continuously obtaining frames of images of a photographed object, and before dividing each frame of image of the photographed object into a light trail region, a background light source region, and a non-light-source region according to a first preset brightness value, the method further includes obtaining brightness of the frames of images of the photographed object, and adjusting, according to the directly obtained value of the parameter, the parameter needing to be set in the slow shutter photographing mode if a value of a parameter needing to be set in the slow shutter photographing mode is directly obtained, where the value of the parameter needing to be set in the slow shutter photographing mode is set by a user according to the brightness of the images.

With reference to any one of the first aspect to the second possible implementation of the first aspect, in a third possible implementation, after merging the non-light-source regions of one or more of the frames of images of the photographed object, and setting a merged non-light-source region as a non-light-source region of the target image to enhance brightness of the merged non-light-source region of the target image and avoid overexposure, and before storing the target image after obtaining a photographing instruction, the method further includes performing brightness smoothing process on boundaries of the light trail region, the background light source region, and the non-light-source region.

With reference to any one of the first aspect to the third possible implementation of the first aspect, in a fourth possible implementation, adjusting, when the percentage value is greater than or equal to an upper limit of a preset percentage threshold, the value of the parameter needing to be set in the slow shutter photographing mode to reduce the percentage value such that the reduced percentage value in the image after photographing is within a range of the preset percentage threshold includes reducing a value of exposure time and an International Organization for Standardization (ISO) value when the percentage value is greater than or equal to the upper limit of the preset percentage threshold such that the reduced percentage value in the image after the photographing is within the range of the preset percentage threshold.

With reference to any one of the first aspect to the fourth possible implementation of the first aspect, in a fifth possible implementation, dividing each frame of image of the photographed object into a light trail region, a background light source region, and a non-light-source region according to a first preset brightness value includes dividing each frame of image of the photographed object into the light trail region, the background light source region, and the non-light-source region according to the first preset brightness value, where the light trail region is a region in which a difference exists between the frames of images at a same pixel location and a brightness value is greater than or equal to the first preset brightness value, the background light source region is a region in which no difference exists between the frames of images at a same pixel location and a brightness value is greater than or equal to the first preset brightness value, and the non-light-source region is a region in which no difference exists between the frames of images at a same pixel location and a brightness value is less than the first preset brightness value.

With reference to any one of the first aspect to the fifth possible implementation of the first aspect, in a sixth possible implementation, merging the non-light-source regions of one or more of the frames of images of the photographed object, and setting a merged non-light-source region as a non-light-source region of the target image to enhance brightness of the merged non-light-source region of the target image and avoid overexposure includes merging the non-light-source regions of the first N frames of images obtained chronologically in the frames of images of the photographed object, adding a brightness value C of the merged non-light-source region and a brightness value of the non-light-source region of the $(N+1)^{th}$ frame obtained chronologically to obtain a brightness value D, and setting the merged non-light-source region of the first N frames of images as the non-light-source region of the target image if the brightness value D is greater than or equal to the first preset brightness value.

A second aspect provides a photographing method, including entering the slow shutter photographing mode after obtaining an instruction of entering a slow shutter photographing mode, continuously obtaining frames of images of a photographed object, dividing each frame of image of the photographed object into a light trail region, and a non-light-source region according to a first preset brightness value, merging the light trail regions of the frames of images of the photographed object, setting the merged light trail region as a light trail region of a target image, merging the non-light-source regions of one or more of the frames of images of the photographed object, setting a merged non-light-source region as a non-light-source region of the target image to enhance brightness of the merged non-light-source region of the target image and avoid overexposure, and storing the target image after obtaining a photographing instruction.

In a first possible implementation of the second aspect, after continuously obtaining frames of images of a photographed object, and before dividing each frame of image of the photographed object into a light trail region, and a non-light-source region according to a first preset brightness value, the method further includes obtaining brightness of the frames of images of the photographed object, obtaining, according to the obtained brightness, a quantity of pixels whose brightness is greater than or equal to a second preset brightness value in an image of the photographed object if a value of a parameter needing to be set in the slow shutter photographing mode is not directly obtained, calculating, according to the quantity of the pixels whose brightness is greater than or equal to the second preset brightness value and a total quantity of pixels in the image of the photographed object, a percentage value of the pixel whose brightness is greater than or equal to the second preset brightness value, and adjusting, when the percentage value is greater than or equal to an upper limit of a preset percentage threshold, the value of the parameter needing to be set in the slow shutter photographing mode to reduce the percentage value such that the reduced percentage value in the image after photographing is within a range of the preset percentage threshold.

With reference to the second aspect, in a second possible implementation, after continuously obtaining frames of images of a photographed object, and before dividing each frame of image of the photographed object into a light trail region, and a non-light-source region according to a first preset brightness value, the method further includes obtaining brightness of the frames of images of the photographed object, adjusting, according to the directly obtained value of the parameter, the parameter needing to be set in the slow shutter photographing mode if a value of a parameter needing to be set in the slow shutter photographing mode is directly obtained, where the value of the parameter needing to be set in the slow shutter photographing mode is set by a user according to the brightness of the images.

With reference to any one of the second aspect to the second possible implementation of the second aspect, in a third possible implementation, after merging the non-light-source regions of one or more of the frames of images of the photographed object, and setting a merged non-light-source region as a non-light-source region of the target image to enhance brightness of the merged non-light-source region of the target image and avoid overexposure, and before storing the target image after obtaining a photographing instruction, the method further includes performing brightness smoothing process on boundaries of the light trail region and the non-light-source region.

With reference to any one of the second aspect to the third possible implementation of the second aspect, in a fourth possible implementation, adjusting, when the percentage value is greater than or equal to an upper limit of a preset percentage threshold, the value of the parameter needing to be set in the slow shutter photographing mode to reduce the percentage value such that the reduced percentage value in the image after the photographing is within a range of the preset percentage threshold includes reducing a value of exposure time and an ISO value when the percentage value is greater than or equal to the upper limit of the preset percentage threshold such that the reduced percentage value in the image after photographing is within the range of the preset percentage threshold.

With reference to any one of the second aspect to the fourth possible implementation of the second aspect, in a fifth possible implementation, dividing each frame of image of the photographed object into a light trail region and a non-light-source region according to a first preset brightness value includes dividing each frame of image of the photographed object into the light trail region and the non-light-source region according to the first preset brightness value, where the light trail region is a region in which a difference exists between the frames of images at a same pixel location and a brightness value is greater than or equal to the first preset brightness value, and the non-light-source region is a region in which no difference exists between the frames of images at a same pixel location and a brightness value is less than the first preset brightness value.

With reference to any one of the second aspect to the fifth possible implementation of the second aspect, in a sixth possible implementation, merging the non-light-source regions of one or more of the frames of images of the photographed object, and setting a merged non-light-source region as a non-light-source region of the target image to enhance brightness of the merged non-light-source region of the target image and avoid overexposure includes merging the non-light-source regions of the first N frames of images obtained chronologically in the frames of images of the photographed object, adding a brightness value C of the merged non-light-source region and a brightness value of the non-light-source region of the $(N+1)^{th}$ frame obtained chronologically to obtain a brightness value D, and setting the merged non-light-source region of the first N frames of images as the non-light-source region of the target image if the brightness value D is greater than or equal to the first preset brightness value.

A third aspect provides a photographing method, including entering the slow shutter photographing mode after obtaining an instruction of entering a slow shutter photographing mode, continuously obtaining frames of images of a photographed object, dividing each frame of image of the photographed object into a light trail region, a background light source region, and a according to a first preset brightness value, merging the light trail regions of the frames of images of the photographed object, setting the merged light trail region as a light trail region of a target image, setting the background light source regions of one or more of the frames of images of the photographed object as a background light source region of the target image, to avoid overexposure of the background light source region of the target image, and storing the target image after obtaining a photographing instruction.

In a first possible implementation of the third aspect, after continuously obtaining frames of images of a photographed object, and before the dividing each frame of image of the photographed object into a light trail region and a background light source region according to a first preset brightness value, the method further includes obtaining brightness of the frames of images of the photographed object, obtaining, according to the obtained brightness, a quantity of pixels whose brightness is greater than or equal to a second preset brightness value in an image of the photographed object if a value of a parameter needing to be set in the slow shutter photographing mode is not directly obtained, calculating, according to the quantity of the pixels whose brightness is greater than or equal to the second preset brightness value and a total quantity of pixels in the image of the photographed object, a percentage value of the pixel whose brightness is greater than or equal to the second preset brightness value, and adjusting, when the percentage value is greater than or equal to an upper limit of a preset percentage threshold, the value of the parameter needing to be set in the slow shutter photographing mode to reduce the percentage value such that the reduced percentage value in the image after the photographing is within a range of the preset percentage threshold.

With reference to the third aspect, in a second possible implementation, after continuously obtaining frames of images of a photographed object, and before dividing each frame of image of the photographed object into a light trail region, a background light source region, and a non-light-source region according to a first preset brightness value, the method further includes obtaining brightness of the frames of images of the photographed object, adjusting, according to the directly obtained value of the parameter, the parameter needing to be set in the slow shutter photographing mode if a value of a parameter needing to be set in the slow shutter photographing mode is directly obtained, where the value of the parameter needing to be set in the slow shutter photographing mode is set by a user according to the brightness of the images.

With reference to any one of the third aspect to the second possible implementation of the third aspect, in a third possible implementation, after setting the background light source regions of one or more of the frames of images of the photographed object as a background light source region of the target image to avoid overexposure of the background light source region of the target image, and before storing the target image after obtaining a photographing instruction, the method further includes performing brightness smoothing process on boundaries of the light trail region and the background light source region.

With reference to any one of the third aspect to the third possible implementation of the third aspect, in a fourth possible implementation, adjusting, when the percentage value is greater than or equal to an upper limit of a preset percentage threshold, the value of the parameter needing to be set in the slow shutter photographing mode to reduce the percentage value such that the reduced percentage value in the image after photographing is within a range of the preset percentage threshold includes reducing a value of exposure time and an ISO value when the percentage value is greater than or equal to the upper limit of the preset percentage threshold such that the reduced percentage value in the image after photographing is within the range of the preset percentage threshold. With reference to any one of the third aspect to the fourth possible implementation of the third aspect, in a fifth possible implementation, dividing each frame of image of the photographed object into a light trail region and a background light source region according to a first preset brightness value includes dividing each frame of image of the photographed object into the light trail region and the background light source region according to the first preset brightness value, where the light trail region is a region in which a difference exists between the frames of images at a same pixel location and a brightness value is greater than or equal to the first preset brightness value, and the background light source region is a region in which no difference exists between the frames of images at a same pixel location and a brightness value is greater than or equal to the first preset brightness value.

A fourth aspect provides a photographing apparatus, including a first obtaining module configured to obtain an instruction of entering a slow shutter photographing mode, where the first obtaining module is further configured to continuously obtain frames of images of a photographed object after photographing apparatus enters the slow shutter photographing mode according to the instruction of entering the slow shutter photographing mode, a first processing module configured to divide each frame of image of the photographed object into a light trail region, a background light source region, and a non-light-source region according to a first preset brightness value, where the first processing module is further configured to merge the light trail regions of the frames of images of the photographed object, and set a merged light trail region as a light trail region of a target image, the first processing module is further configured to set the background light source regions of one or more of the frames of images of the photographed object as a background light source region of the target image to avoid overexposure of the background light source region of the target image, and the first processing module is further configured to merge the non-light-source regions of one or more of the frames of images of the photographed object, and set a merged non-light-source region as a non-light-source region of the target image, to enhance brightness of the merged non-light-source region of the target image and avoid overexposure, and a first photographing module configured to store the target image after obtaining a photographing instruction.

In a first possible implementation of the fourth aspect, the first processing module is further configured to obtain, according to the brightness, a quantity of pixels whose brightness is greater than or equal to a second preset brightness value in an image of the photographed object if a value of a parameter needing to be set in the slow shutter photographing mode is not directly obtained, after brightness of the frames of images of the photographed object is obtained, calculate, according to the quantity of the pixels whose brightness is greater than or equal to the second preset brightness value and a total quantity of pixels in the image of the photographed object, a percentage value of the pixel whose brightness is greater than or equal to the second preset brightness value, and adjust the value of the parameter needing to be set in the slow shutter photographing mode to reduce the percentage value such that the reduced percentage value in the image after the photographing is within a range of the preset percentage threshold when the percentage value is greater than or equal to an upper limit of a preset percentage threshold.

With reference to the fourth aspect, in a second possible implementation, the first processing module is further configured to adjust, according to the directly obtained value of the parameter, the parameter needing to be set in the slow shutter photographing mode if the value of the parameter needing to be set in the slow shutter photographing mode is directly obtained, where the value of the parameter needing to be set in the slow shutter photographing mode is set by a user.

With reference to any one of the fourth aspect to the second possible implementation of the fourth aspect, in a third possible implementation, the first processing module is further configured to perform brightness smoothing process on boundaries of the light trail region, the background light source region, and the non-light-source region.

With reference to any one of the fourth aspect to the third possible implementation of the fourth aspect, in a fourth possible implementation, when the percentage value is greater than or equal to an upper limit of a preset percentage threshold, when adjusting the value of the parameter needing to be set in the slow shutter photographing mode to reduce the percentage value such that the reduced percentage value in the image after the photographing is within the range of the preset percentage threshold, the first processing module is further configured to reduce a value of exposure time and an ISO value when the percentage value is greater than or equal to the upper limit of the preset percentage threshold such that the reduced percentage value in the image after the photographing is within the range of the preset percentage threshold.

With reference to any one of the fourth aspect to the fourth possible implementation of the fourth aspect, in a fifth possible implementation, when dividing each frame of image of the photographed object into the light trail region, the background light source region, and the non-light-source region according to the first preset brightness value, the first processing module is further configured to divide each frame of image of the photographed object into the light trail region, the background light source region, and the non-light-source region according to the first preset brightness value, where the light trail region is a region in which a difference exists between the frames of images at a same pixel location and a brightness value is greater than or equal to the first preset brightness value, the background light source region is a region in which no difference exists between the frames of images at a same pixel location and a brightness value is greater than or equal to the first preset brightness value, and the non-light-source region is a region in which no difference exists between the frames of images at a same pixel location and a brightness value is less than the first preset brightness value.

With reference to any one of the fourth aspect to the fifth possible implementation of the fourth aspect, in a sixth possible implementation, when merging the non-light-source regions of one or more of the frames of images of the photographed object, and setting the merged non-light-source region as the non-light-source region of the target image to enhance the brightness of the merged non-light-source region of the target image and avoid overexposure, the first processing module is further configured to merge the non-light-source regions of the first N frames of images obtained chronologically in the frames of images of the photographed object, add a brightness value C of the merged non-light-source region and a brightness value of the non-light-source region of the $(N+1)^{th}$ frame obtained chronologically to obtain a brightness value D, and set the merged non-light-source region of the first N frames of images as the non-light-source region of the target image if the brightness value D is greater than or equal to the first preset brightness value, where N is a positive integer.

A fifth aspect provides a photographing apparatus, including a second obtaining module configured to obtain an instruction of entering a slow shutter photographing mode, where the second obtaining module is further configured to continuously obtain frames of images of a photographed object after the photographing apparatus enters the slow shutter photographing mode according to the instruction of entering the slow shutter photographing mode, a second processing module configured to divide each frame of image of the photographed object into a light trail region and a background light source region according to a first preset brightness value, where the second processing module is further configured to merge the light trail regions of the frames of images of the photographed object, and set a merged light trail region as a light trail region of a target image, and the second processing module is further configured to set the background light source regions of one or more of the frames of images of the photographed object as a background light source region of the target image to avoid overexposure of the background light source region of the target image, and store the target image after obtaining a photographing instruction.

In a first possible implementation of the fifth aspect, the second processing module is further configured to obtain, according to the brightness, a quantity of pixels whose brightness is greater than or equal to a second preset brightness value in an image of the photographed object if a value of a parameter needing to be set in the slow shutter photographing mode is not directly obtained, after brightness of the frames of images of the photographed object is obtained, calculate, according to the quantity of the pixels whose brightness is greater than or equal to the second preset brightness value and a total quantity of pixels in the image of the photographed object, a percentage value of the pixel whose brightness is greater than or equal to the second preset brightness value, and adjust the value of the parameter needing to be set in the slow shutter photographing mode to reduce the percentage value such that the reduced percentage value in the image after the photographing is within a range of the preset percentage threshold when the percentage value is greater than or equal to an upper limit of a preset percentage threshold.

With reference to the fifth aspect, in a second possible implementation, the second processing module is further configured to adjust, according to the directly obtained value of the parameter, the parameter needing to be set in the slow shutter photographing mode if the value of the parameter needing to be set in the slow shutter photographing mode is directly obtained, where the value of the parameter needing to be set in the slow shutter photographing mode is set by a user.

With reference to any one of the fifth aspect to the second possible implementation of the fifth aspect, in a third possible implementation, the second processing module is further configured to perform brightness smoothing process on boundaries of the light trail region and the background light source region.

With reference to any one of the fifth aspect to the third possible implementation of the fifth aspect, in a fourth possible implementation, when dividing each frame of image of the photographed object into the light trail region and the background light source region according to the first preset brightness value, the second processing module is further configured to divide each frame of image of the photographed object into the light trail region and the background light source region according to the first preset brightness value, where the light trail region is a region in which a difference exists between the frames of images at a same pixel location and a brightness value is greater than or equal to the first preset brightness value, and the background light source region is a region in which no difference exists between the frames of images at a same pixel location and a brightness value is greater than or equal to the first preset brightness value.

A sixth aspect provides a photographing method, including a third obtaining module configured to obtain an instruction of entering a slow shutter photographing mode, and a third processing module configured to adjust, according to brightness of frames of images of a photographed object, a value of a parameter needing to be set in the slow shutter photographing mode to avoid overexposure of a target image after the photographing, where the third processing module is configured to divide each frame of image of the photographed object into a light trail region and a non-light-source region according to a first preset brightness value, and the third processing module is further configured to merge the light trail regions of the frames of images of the photographed object, and set a merged light trail region as a light trail region of the target image. The third processing module is further configured to merge the non-light-source regions of one or more of the frames of images of the photographed object, and set a merged non-light-source region as a non-light-source region of the target image to enhance brightness of the merged non-light-source region of the target image and avoid overexposure, and store the target image after obtaining a photographing instruction.

In a first possible implementation of the sixth aspect, the third processing module is further configured to obtain, according to the brightness, a quantity of pixels whose brightness is greater than or equal to a second preset brightness value in an image of the photographed object if the value of the parameter needing to be set in the slow shutter photographing mode is not directly obtained, after the brightness of the frames of images of the photographed object is obtained, calculate, according to the quantity of the pixels whose brightness is greater than or equal to the second preset brightness value and a total quantity of pixels in the image of the photographed object, a percentage value of the pixel whose brightness is greater than or equal to the second preset brightness value, and adjust the value of the parameter needing to be set in the slow shutter photographing mode to reduce the percentage value such that the reduced percentage value in the image after the photographing is within a range of the preset percentage threshold when the percentage value is greater than or equal to an upper limit of a preset percentage threshold.

With reference to the sixth aspect, in a second possible implementation, the third processing module is further configured to adjust, according to the directly obtained value of the parameter, the parameter needing to be set in the slow shutter photographing mode if the value of the parameter needing to be set in the slow shutter photographing mode is directly obtained, where the value of the parameter needing to be set in the slow shutter photographing mode is set by a user.

With reference to any one of the sixth aspect to the second possible implementation of the sixth aspect, in a third possible implementation, the third processing module is further configured to perform brightness smoothing process on boundaries of the light trail region and the non-light-source region.

With reference to any one of the sixth aspect to the third possible implementation of the sixth aspect, in a fourth possible implementation, when dividing each frame of image of the photographed object into the light trail region and the non-light-source region according to the first preset brightness value, the third processing module is further configured to divide each frame of image of the photographed object into the light trail region and the non-light-source region according to the first preset brightness value, where the light trail region is a region in which a difference exists between the frames of images at a same pixel location and a brightness value is greater than or equal to the first preset brightness value, and the non-light-source region is a region in which no difference exists between the frames of images at a same pixel location and a brightness value is less than the first preset brightness value.

With reference to any one of the sixth aspect to the fourth possible implementation of the sixth aspect, in a fifth possible implementation, when merging the non-light-source regions of one or more of the frames of images of the photographed object, and setting the merged non-lightsource region as the non-light-source region of the target image to enhance the brightness of the merged non-light-source region of the target image and avoid overexposure, the third processing module is further configured to merge the non-light-source regions of the first N frames of images obtained chronologically in the frames of images of the photographed object, add a brightness value C of the merged non-light-source region and a brightness value of the non-light-source region of the $(N+1)^{th}$ frame obtained chronologically to obtain a brightness value D, and set the merged non-light-source region of the first N frames of images as the non-light-source region of the target image if the brightness value D is greater than or equal to the first preset brightness value, where N is a positive integer.

Beneficial effects include each frame of image of a photographed object is divided into a light trail region, a background light source region, and a non-light-source region, or into a light trail region and a background light source region, or into a light trail region and a non-light-source region according to a first preset brightness value, and processing of different brightness values is performed for different regions based on the divided regions such that a user not experienced in photographing can obtain a high-quality image of a moving trail of a light source through photographing, the obtained image can reflect the moving trail of the light source, and the image is of high sharpness and is not overexposed. For example, using the method or the apparatus, images including effects of a light-trail pattern formed after a handheld light source is moved, a glimpse of fireworks display that easily disappears, and a silky water effect brought by magnificent waterfalls can be obtained simply and conveniently.

BRIEF DESCRIPTION OF DRAWINGS

To describe the technical solutions in the embodiments of the present application more clearly, the following briefly describes the accompanying drawings required for describing the embodiments. The accompanying drawings in the following description show some embodiments of the present application, and a person of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. The described embodiments are some but not all of the embodiments of the present application. All other embodiments obtained by a person of ordinary skill in the art based on the embodiments of the present application without creative efforts shall fall within the protection scope of the present application.

Figure 1:
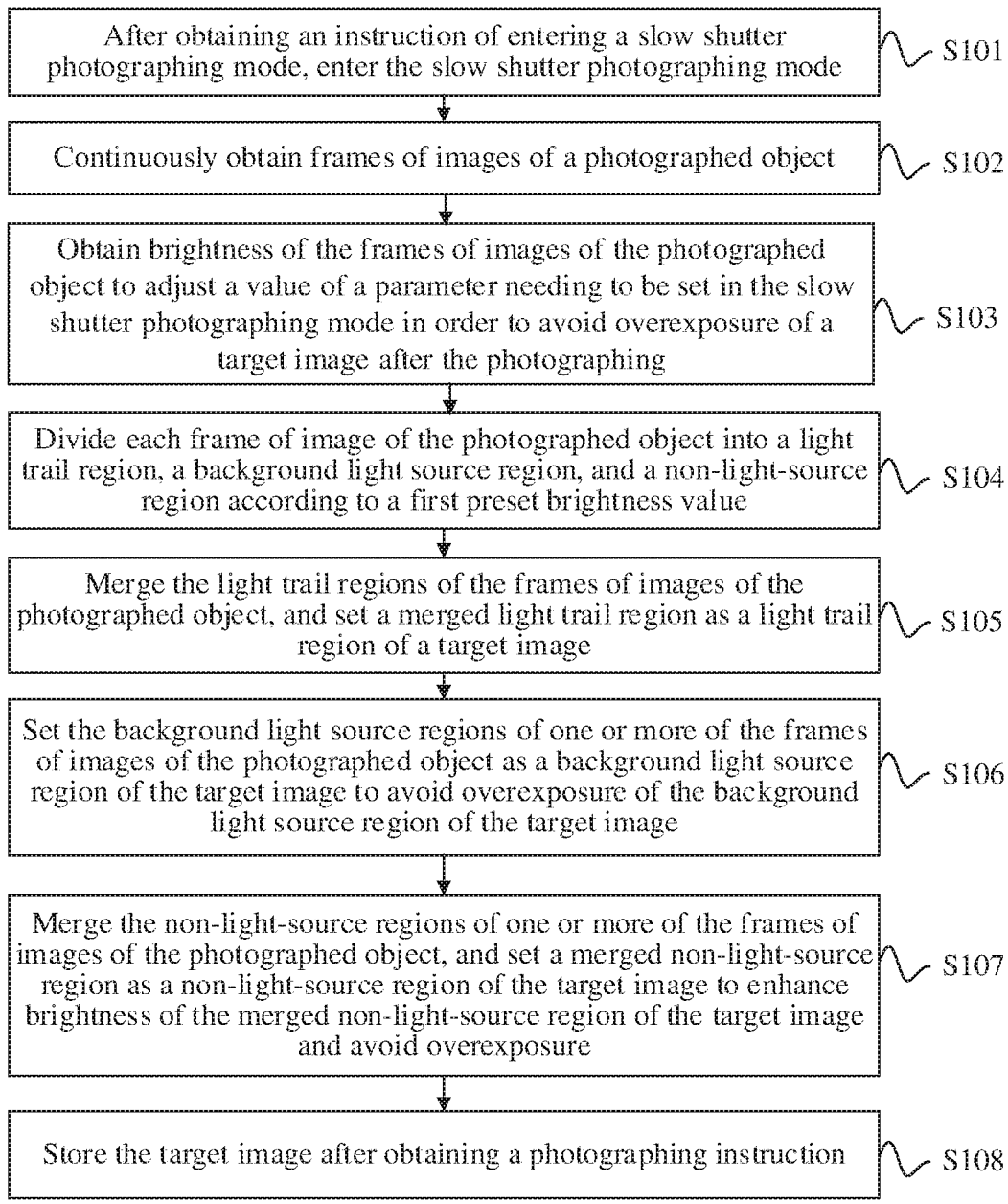
FIG. 1 is a flowchart of Embodiment 1 of a photographing method according to an embodiment of the present application.

As shown in FIG. 1, Embodiment 1 of a photographing method according to an embodiment of the present application includes the following steps.

Step S101: After obtaining an instruction of entering a slow shutter photographing mode, enter the slow shutter photographing mode. Further, a processor of a photographing apparatus obtains, using an input device, the instruction of entering the slow shutter photographing mode that is input or selected by a user.

Step S102: Continuously obtain frames of images of a photographed object. Further, after entering the slow shutter photographing mode, the processor of the photographing apparatus obtains the frames of images of the photographed object at different moments using a camera, and displays the frames of images on a screen of the photographing apparatus.

Step S103: Obtain brightness of the frames of images of the photographed object to adjust a value of a parameter needing to be set in the slow shutter photographing mode in order to avoid overexposure of a target image after the photographing. Further, after the brightness of the frames of images is obtained, statistics is collected on a percentage of a pixel whose brightness is greater than or equal to a particular brightness value in all pixels, and the percentage value is adjusted to a particular threshold, to adjust overall brightness of the target image.

Step S104: Divide each frame of image of the photographed object into a light trail region, a background light source region, and a non-light-source region according to a first preset brightness value, where the light trail region is a region formed by a moving object of the photographed object during movement, and includes a trail formed by waterfalls, a shooting star, or fireworks, the background light source region is another light source region other than the light trail region of the photographed object, for example, a street lamp or stars, and the non-light-source region is a region in which there is no light source. A value of the first preset brightness value is about 210.

Step S105: Merge the light trail regions of the frames of images of the photographed object, and set a merged light trail region as a light trail region of the target image. Further, brightness of pixels at a same location in the light trail regions of the frames of images is added, and the added brightness is used as brightness of the merged light trail region. Alternatively, brightness of pixels at a same location in the light trail regions of some of the frames of images is added, and the added brightness is used as brightness of the merged light trail region.

Step S106: Set the background light source regions of one or more of the frames of images of the photographed object as a background light source region of the target image to avoid overexposure of the background light source region of the target image. Further, the background light source region of any one of the frames of images of the photographed object is used as the background light source region of the target image after the photographing to avoid overexposure of the background light source region of the target image after the photographing. Alternatively, when the background light source region of the target image after the photographing is not overexposed, the background light source regions of multiple frames of images of the frames of images of the photographed object are used as the background light source region of the target image after the photographing.

Step S107: Merge the non-light-source regions of one or more of the frames of images of the photographed object, and set a merged non-light-source region as a non-light-source region of the target image to enhance brightness of the merged non-light-source region of the target image and avoid overexposure. Further, the non-light-source regions of the first N frames of images obtained chronologically in the frames of images of the photographed object are merged and the merged non-light-source region is used as the non-light-source region of the target image to enhance brightness of the merged non-light-source region of the target image and avoid overexposure, where a value of N is a positive integer. Brightness of pixels at a same location in the non-light-source regions of the first N frames of images is added, and the added brightness is used as brightness of the merged non-light-source region, to enhance the brightness, present more details of the non-light-source region of the image, and avoid overexposure. Alternatively, the non-light-source region of one of the frames of images of the photographed object is used as the non-light-source region of the target image to enhance the brightness of the merged non-light-source region of the target image and avoid overexposure. Alternatively, when the non-light-source region of the target image after the photographing is not overexposed, the non-light-source regions of any multiple frames of images of the frames of images of the photographed object are merged and the merged non-light-source region is used as the non-light-source region of the target image.

Step S108: Store the target image after obtaining a photographing instruction. Further, for the target image whose light trail region, background light source region, and non-light-source region have been processed, the photographing apparatus stores the target image into a memory after obtaining an instruction of pressing a shutter and executing a photographing action. Alternatively, the target image including the light trail region, the background light source region, and the non-light-source region that have been processed by the processor is first displayed on the screen of the photographing apparatus for preview, and after an instruction of pressing a shutter and executing a photographing action is obtained, the image that is previewed on the screen and is processed is stored into a storage medium.

Beneficial effects include that each frame of image of a photographed object is divided into a light trail region, a background light source region, and a non-light-source region according to a first preset brightness value, and processing of different brightness values is performed for the three regions such that a user not experienced in photographing can obtain a high-quality image of a moving trail of a light source through photographing, and the obtained image is of high-quality sharpness and exposure, and can also effectively reflect the moving trail of the light source. For example, images including effects of a light-trail pattern formed after a handheld light source is moved, a glimpse of fireworks display that easily disappears, and a silky water effect brought by magnificent waterfalls can be obtained by means of photographing.

Further, after continuously obtaining frames of images of a photographed object, and before dividing each frame of image of the photographed object into a light trail region, a background light source region, and a non-light-source region according to a first preset brightness value, the method further includes obtaining the brightness of the frames of images of the photographed object, obtaining, according to the obtained brightness, a quantity of pixels whose brightness is greater than or equal to a second preset brightness value in an image of the photographed object if the value of the parameter needing to be set in the slow shutter photographing mode is not directly obtained, calculating, according to the quantity of the pixels whose brightness is greater than or equal to the second preset brightness value and a total quantity of pixels in the image of the photographed object, a percentage value of the pixel whose brightness is greater than or equal to the second preset brightness value, and adjusting, when the percentage value is greater than or equal to an upper limit of a preset percentage threshold, the value of the parameter needing to be set in the slow shutter photographing mode to reduce the percentage value such that the reduced percentage value in the image is within a range of the preset percentage threshold.

Beneficial effects include that when the user does not enter the value of the parameter needing to be set for a slow shutter, the percentage value of the pixel whose brightness is greater than or equal to the second preset brightness value is adjusted to adjust overall brightness of the image and avoid overexposure of the obtained target image. This is an auto-adjustment mode of the photographing apparatus.

Further, after continuously obtaining frames of images of a photographed object, and before dividing each frame of image of the photographed object into a light trail region, a background light source region, and a non-light-source region according to a first preset brightness value, the method further includes obtaining the brightness of the frames of images of the photographed object, and adjusting, according to the directly obtained value of the parameter, the parameter needing to be set in the slow shutter photographing mode if the value of the parameter needing to be set in the slow shutter photographing mode is directly obtained, where the value of the parameter needing to be set in the slow shutter photographing mode is set by the user according to the brightness of the images.

Beneficial effects include that when the user-entered value of the parameter needing to be set for the slow shutter is directly obtained, the parameter needing to be set in the slow shutter photographing mode is directly set to adjust the overall brightness of the image and avoid overexposure of the obtained target image. This is a manual adjustment mode.

Further, after merging the non-light-source regions of one or more of the frames of images of the photographed object, and setting a merged non-light-source region as a non-light-source region of the target image to enhance brightness of the merged non-light-source region of the target image and avoid overexposure, and before storing the target image after obtaining a photographing instruction, the method further includes performing brightness smoothing process on boundaries of the light trail region, the background light source region, and the non-light-source region.

Beneficial effects include that brightness smoothing process is performed on the boundaries such that the brightness of the image changes gently.

Further, adjusting, when the percentage value is greater than or equal to an upper limit of a preset percentage threshold, the value of the parameter needing to be set in the slow shutter photographing mode to reduce the percentage value such that the reduced percentage value in the image after photographing is within a range of the preset percentage threshold includes reducing a value of exposure time and an ISO value when the percentage value is greater than or equal to the upper limit of the preset percentage threshold such that the reduced percentage value in the image after the photographing is within the range of the preset percentage threshold.

Beneficial effects include that the parameter needing to be set in the slow shutter photographing mode is set to adjust the overall brightness of the image, and the value of the exposure time and the ISO value are reduced to avoid overexposure of the obtained target image.

Further, dividing each frame of image of the photographed object into a light trail region, a background light source region, and a non-light-source region according to a first preset brightness value includes dividing each frame of image of the photographed object into the light trail region, the background light source region, and the non-light-source region according to a difference degree of the images at a same pixel location in the frames of images of the photographed object and the first preset brightness value, where the difference degree refers to whether the images at the same pixel location in the frames of images of the photographed object are different.

Further, dividing each frame of image of the photographed object into a light trail region, a background light source region, and a non-light-source region according to a first preset brightness value includes dividing each frame of image of the photographed object into the light trail region, the background light source region, and the non-light-source region according to the first preset brightness value (about 210), where the light trail region is a region in which a difference exists between the frames of images at a same pixel location and a brightness value is greater than or equal to the first preset brightness value (about 210), the background light source region is a region in which no difference exists between the frames of images at a same pixel location and a brightness value is greater than or equal to the first preset brightness value (about 210), and the non-light-source region is a region in which no difference exists between the frames of images at a same pixel location and a brightness value is less than the first preset brightness value (about 210).

Beneficial effects include each frame of image is divided into the light trail region, the background light source region, and the non-light-source region such that the photographing apparatus can separately perform particular image processing on the regions.

Further, merging the non-light-source regions of one or more of the frames of images of the photographed object, and setting a merged non-light-source region as a non-light-source region of the target image to enhance brightness of the merged non-light-source region of the target image and avoid overexposure includes merging the non-light-source regions of the first N frames of images obtained chronologically in the frames of images of the photographed object, adding a brightness value C of the merged non-light-source region and a brightness value of the non-light-source region of the (N+1)$^{th}$ frame obtained chronologically to obtain a brightness value D, and setting the merged non-light-source region of the first N frames of images as the non-light-source region of the target image if the brightness value D is greater than or equal to the first preset brightness value, where N is a positive integer.

Beneficial effects include selecting frames that are used to form the non-light-source region of the target image by merging enhances the brightness of the non-light-source region of the image obtained through photographing and avoids overexposure such that details of the non-light-source region of the image can be presented more effectively.

Figure 2:
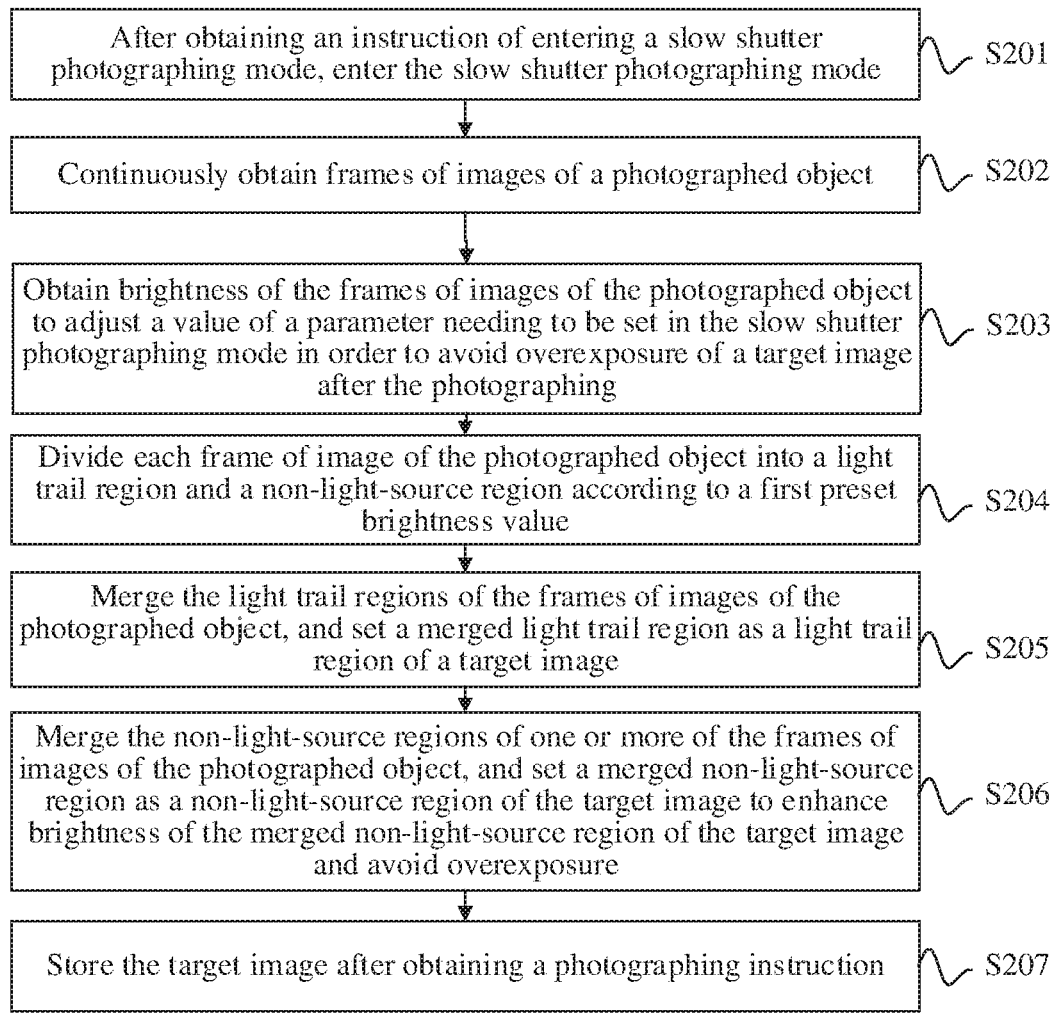
FIG. 2 is a flowchart of Embodiment 2 of a photographing method according to an embodiment of the present application.

As shown in FIG. 2. Embodiment 2 of a photographing method according to an embodiment of the present application includes the following steps.

Step S201: After obtaining an instruction of entering a slow shutter photographing mode, enter the slow shutter photographing mode. Further, a processor of a photographing apparatus obtains, using an input device, the instruction of entering the slow shutter photographing mode that is input or selected by a user.

Step S202: Continuously obtain frames of images of a photographed object. Further, after entering the slow shutter photographing mode, the processor of the photographing apparatus obtains the frames of images of the photographed object at different moments using a camera, and displays the frames of images on a screen of the photographing apparatus.

Step S203: Obtain brightness of the frames of images of the photographed object to adjust a value of a parameter needing to be set in the slow shutter photographing mode in order to avoid overexposure of a target image after the photographing. After the brightness of the frames of images is obtained, statistics is collected on a percentage of a pixel whose brightness is greater than or equal to a particular brightness value in all pixels, and the percentage value is adjusted to a particular threshold, to adjust overall brightness of the target image.

Step S204: Divide each frame of image of the photographed object into a light trail region and a non-light-source region according to a first preset brightness value, where the light trail region is a region formed by a moving object of the photographed object during movement, and includes a trail formed by waterfalls, a shooting star, or fireworks, and the non-light-source region is a region in which there is no light source. The first preset brightness value is about 210.

Step S205: Merge the light trail regions of the frames of images of the photographed object, and set a merged light trail region as a light trail region of the target image. Further, brightness of pixels at a same location in the light trail regions of the frames of images is added, and the added brightness is used as brightness of the merged light trail region.

Step S206: Merge the non-light-source regions of one or more of the frames of images of the photographed object, and set a merged non-light-source region as a non-light-source region of the target image to enhance brightness of the merged non-light-source region of the target image and avoid overexposure. Further, brightness of pixels at a same location in the non-light-source regions of the first N frames of images is added, and the added brightness is used as brightness of the merged light trail region to enhance the brightness, present more details of the non-light-source region of the image, and avoid overexposure. Brightness of pixels at a same location in the non-light-source regions of the first N frames of images is added, and the added brightness is used as brightness of the merged light trail region, to enhance the brightness, present more details of the non-light-source region of the image, and avoid overexposure. Alternatively, the non-light-source region of one of the frames of images of the photographed object is merged and is used as the non-light-source region of the target image, to enhance the brightness of the merged non-light-source region of the target image and avoid overexposure. Alternatively, when the non-light-source region of the target image after the photographing is not overexposed, the non-light-source regions of any multiple frames of images of the frames of images of the photographed object are merged and the merged non-light-source region is used as the non-light-source region of the target image.

Step S207: Store the target image after obtaining a photographing instruction. Further, for the target image whose light trail region and non-light-source region have been processed, the photographing apparatus stores the target image into a memory after obtaining an instruction of pressing a shutter and executing a photographing action. Alternatively, the target image including the light trail region, the background light source region, and the non-light-source region that have been processed by the processor is first displayed on the screen of the photographing apparatus for preview, and after an instruction of pressing a shutter and executing a photographing action is obtained, the image that is previewed on the screen and is processed is stored into a storage medium.

Beneficial effects include that each frame of image of a photographed object is divided into a light trail region and a non-light-source region according to a first preset brightness value, and processing of different brightness values is performed for the two regions such that a user not experienced in photographing can obtain a high-quality image of a moving trail of a light source through photographing, and the obtained image is of high-quality sharpness and exposure, and can also effectively reflect the moving trail of the light source. For example, images including effects of a light-trail pattern formed after a handheld light source is moved, a glimpse of fireworks display that easily disappears, and a silky water effect brought by magnificent waterfalls can be obtained by means of photographing.

Further, after continuously obtaining frames of images of a photographed object, and before dividing each frame of image of the photographed object into a light trail region and a non-light-source region according to a first preset brightness value, the method further includes obtaining the brightness of the frames of images of the photographed object, obtaining, according to the obtained brightness, a quantity of pixels whose brightness is greater than or equal to a second preset brightness value in an image of the photographed object if the value of the parameter needing to be set in the slow shutter photographing mode is not directly obtained, calculating, according to the quantity of the pixels whose brightness is greater than or equal to the second preset brightness value and a total quantity of pixels in the image of the photographed object, a percentage value of the pixel whose brightness is greater than or equal to the second preset brightness value, and adjusting, when the percentage value is greater than or equal to an upper limit of a preset percentage threshold, the value of the parameter needing to be set in the slow shutter photographing mode to reduce the percentage value such that the reduced percentage value in the image is within a range of the preset percentage threshold.

Beneficial effects include when the user does not enter the value of the parameter needing to be set for a slow shutter, the percentage value of the pixel whose brightness is greater than or equal to the second preset brightness value is adjusted to adjust overall brightness of the image and avoid overexposure of the obtained target image. This is an auto-adjustment mode of the photographing apparatus.

Further, after continuously obtaining frames of images of a photographed object, and before dividing each frame of image of the photographed object into a light trail region and a non-light-source region according to a first preset brightness value, the method further includes obtaining the brightness of the frames of images of the photographed object, and adjusting, according to the directly obtained value of the parameter, the parameter needing to be set in the slow shutter photographing mode if the value of the parameter needing to be set in the slow shutter photographing mode is directly obtained, where the value of the parameter needing to be set in the slow shutter photographing mode is set by the user according to the brightness of the images.

Beneficial effects include when the user-entered value of the parameter needing to be set for the slow shutter is directly obtained, the parameter needing to be set in the slow shutter photographing mode is directly set to adjust the overall brightness of the image and avoid overexposure of the obtained target image. This is a manual adjustment mode.

Further, after merging the non-light-source regions of one or more of the frames of images of the photographed object, and setting a merged non-light-source region as a non-light-source region of the target image to enhance brightness of the merged non-light-source region of the target image and avoid overexposure, and before storing the target image after obtaining a photographing instruction, the method further includes performing brightness smoothing process on boundaries of the light trail region and the non-light-source region.

Beneficial effects include that brightness smoothing process is performed on the boundaries such that the brightness of the image changes gently.

Further, adjusting, when the percentage value is greater than or equal to an upper limit of a preset percentage threshold, the value of the parameter needing to be set in the slow shutter photographing mode to reduce the percentage value such that the reduced percentage value in the image is within a range of the preset percentage threshold includes reducing a value of exposure time and an ISO value when the percentage value is greater than or equal to the upper limit of the preset percentage threshold such that the reduced percentage value in the image is within the range of the preset percentage threshold.

Beneficial effects include the parameter needing to be set in the slow shutter photographing mode is set to adjust the overall brightness of the image, and the value of the exposure time and the ISO value are reduced to avoid overexposure of the obtained target image.

Further, the dividing each frame of image of the photographed object into a light trail region and a non-light-source region according to a first preset brightness value includes dividing each frame of image of the photographed object into the light trail region and the non-light-source region according to the first preset brightness value, where the light trail region is a region in which a difference exists between the frames of images at a same pixel location and a brightness value is greater than or equal to the first preset brightness value, and the non-light-source region is a region in which no difference exists between the frames of images at a same pixel location and a brightness value is less than the first preset brightness value.

Beneficial effects include that each frame of image is divided into the light trail region and the non-light-source region such that the photographing apparatus can separately perform particular image processing on the regions.

Further, merging the non-light-source regions of one or more of the frames of images of the photographed object, and setting a merged non-light-source region as a non-light-source region of the target image to enhance brightness of the merged non-light-source region of the target image and avoid overexposure includes merging the non-light-source regions of the first N frames of images obtained chronologically in the frames of images of the photographed object, adding a brightness value C of the merged non-light-source region and a brightness value of the non-light-source region of the $(N+1)^{th}$ frame obtained chronologically to obtain a brightness value D, and setting the merged non-light-source region of the first N frames of images as the non-light-source region of the target image if the brightness value D is greater than or equal to the first preset brightness value.

Beneficial effects include selecting frames that are used to form the non-light-source region of the target image by merging enhances the brightness of the non-light-source region of the image obtained through photographing and avoids overexposure such that details of the non-light-source region of the image can be presented more effectively.

Figure 3:
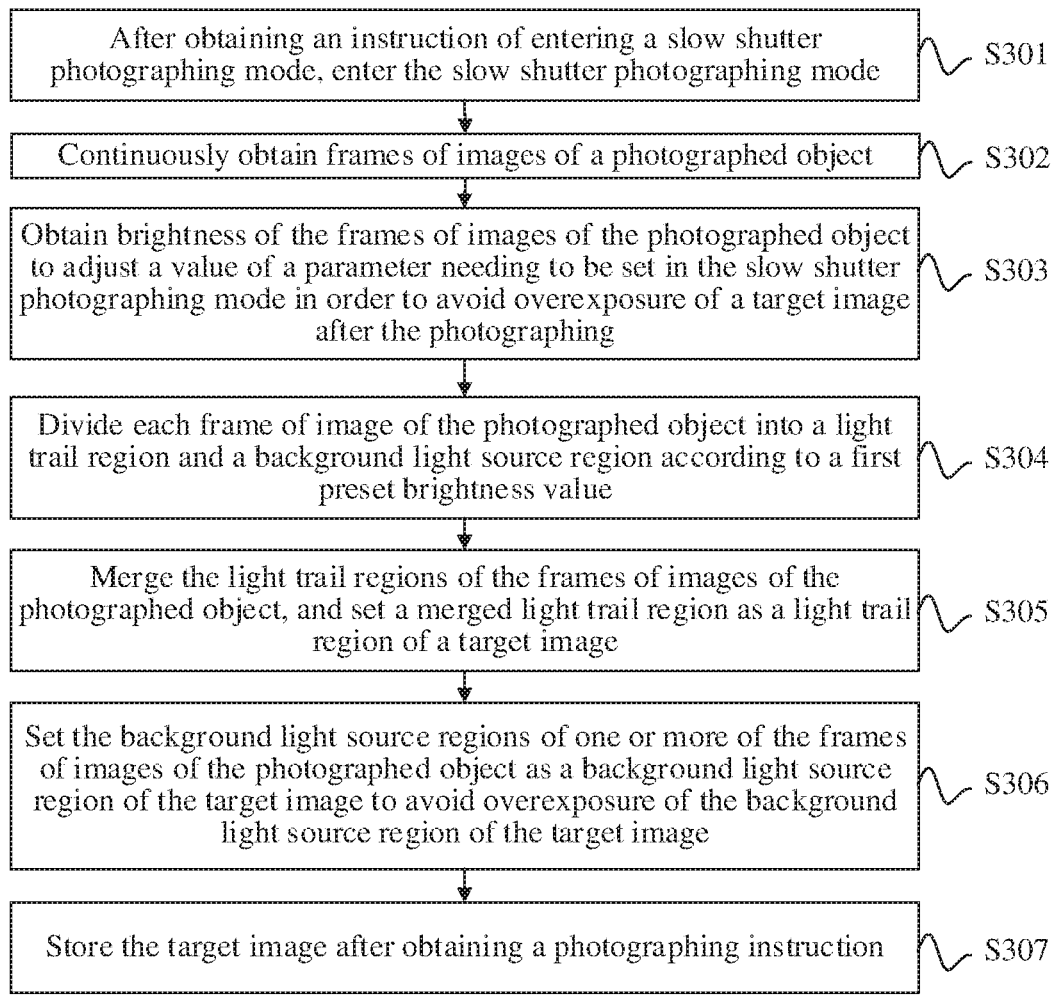
FIG. 3 is a flowchart of Embodiment 3 of a photographing method according to an embodiment of the present application.

As shown in FIG. 3. Embodiment 3 of a photographing method according to an embodiment of the present application includes the following steps.

Step S301: After obtaining an instruction of entering a slow shutter photographing mode, enter the slow shutter photographing mode. Further, a processor of a photographing apparatus obtains, using an input device, the instruction of entering the slow shutter photographing mode that is input or selected by a user.

Step S302: Continuously obtain frames of images of a photographed object. Further, after entering the slow shutter photographing mode, the processor of the photographing apparatus obtains the frames of images of the photographed object at different moments using a camera, and displays the frames of images on a screen of the photographing apparatus.

Step S303: Obtain brightness of the frames of images of the photographed object to adjust a value of a parameter needing to be set in the slow shutter photographing mode in order to avoid overexposure of a target image after the photographing. Further, after the brightness of the frames of images is obtained, statistics is collected on a percentage of a pixel whose brightness is greater than or equal to a particular brightness value in all pixels, and the percentage value is adjusted to a particular threshold to adjust overall brightness of the target image.

Step S304: Divide each frame of image of the photographed object into a light trail region and a background light source region according to a first preset brightness value, where the light trail region is a region formed by a moving object of the photographed object during movement, and includes a trail formed by waterfalls, a shooting star, or fireworks, and the background light source is another light source region other than the light trail region of the photographed object, for example, a street lamp or stars. A value of the first preset brightness value is about 210.

Step S305: Merge the light trail regions of the frames of images of the photographed object, and set a merged light trail region as a light trail region of the target image.

Further, brightness of pixels at a same location in the light trail regions of the frames of images is added, and the added brightness is used as brightness of the merged light trail region.

Step S306: Set the background light source regions of one or more of the frames of images of the photographed object as a background light source region of the target image to avoid overexposure of the background light source region of the target image.

Step S307: Store the target image after obtaining a photographing instruction. Further for the target image whose light trail region and background light source region have been processed, the photographing apparatus stores the target image into a memory after obtaining an instruction of pressing a shutter and executing a photographing action. Alternatively, the target image including the light trail region, the background light source region, and the non-light-source region that have been processed by the processor is first displayed on the screen of the photographing apparatus for preview, and after an instruction of pressing a shutter and executing a photographing action is obtained, the image that is previewed on the screen and is processed is stored into a storage medium.

Beneficial effects include that each frame of image of a photographed object is divided into a light trail region and a background light source region according to a first preset brightness value, and processing of different brightness values is performed for the two regions such that a user not experienced in photographing can obtain a high-quality image of a moving trail of a light source through photographing, and the obtained image is of high-quality sharpness and exposure, and can also effectively reflect the moving trail of the light source. For example, images including effects of a light-trail pattern formed after a handheld light source is moved, a glimpse of fireworks display that easily disappears, and a silky water effect brought by magnificent waterfalls can be obtained by means of photographing.

Further, after continuously obtaining frames of images of a photographed object, and before dividing each frame of image of the photographed object into light trail region and background light source region according to a first preset brightness value, the method further includes obtaining the brightness of the frames of images of the photographed object, obtaining, according to the obtained brightness, a quantity of pixels whose brightness is greater than or equal to a second preset brightness value in an image of the photographed object if the value of the parameter needing to be set in the slow shutter photographing mode is not directly obtained, calculating, according to the quantity of the pixels whose brightness is greater than or equal to the second preset brightness value and a total quantity of pixels in the image of the photographed object, a percentage value of the pixel whose brightness is greater than or equal to the second preset brightness value, and adjusting, when the percentage value is greater than or equal to an upper limit of a preset percentage threshold, the value of the parameter needing to be set in the slow shutter photographing mode to reduce the percentage value such that the reduced percentage value in the image is within a range of the preset percentage threshold.

Beneficial effects include that when the user does not enter the value of the parameter needing to be set for a slow shutter, the percentage value of the pixel whose brightness is greater than or equal to the second preset brightness value is adjusted to adjust overall brightness of the image and avoid overexposure of the obtained target image. This is an auto-adjustment mode of the photographing apparatus.

Further, after continuously obtaining frames of images of a photographed object, and before dividing each frame of image of the photographed object into light trail region and background light source region according to a first preset brightness value, the method further includes obtaining the brightness of the frames of images of the photographed object, and adjusting, according to the directly obtained value of the parameter, the parameter needing to be set in the slow shutter photographing mode if the value of the parameter needing to be set in the slow shutter photographing mode is directly obtained, where the value of the parameter needing to be set in the slow shutter photographing mode is set by the user according to the brightness of the images.

Beneficial effects include that when the user-entered value of the parameter needing to be set for the slow shutter is directly obtained, the parameter needing to be set in the slow shutter photographing mode is directly set to adjust the overall brightness of the image and avoid overexposure of the obtained target image. This is a manual adjustment mode.

Further, after setting the background light source regions of one or more of the frames of images of the photographed object as a background light source region of the target image to avoid overexposure of the background light source region of the target image, and before storing the target image after obtaining a photographing instruction, the method further includes performing brightness smoothing process on boundaries of the light trail region and the background light source region.

Beneficial effects include that brightness smoothing process is performed on the boundaries such that the brightness of the image changes gently.

Further, adjusting, when the percentage value is greater than or equal to an upper limit of a preset percentage threshold, the value of the parameter needing to be set in the slow shutter photographing mode to reduce the percentage value such that the reduced percentage value in the image is within a range of the preset percentage threshold includes reducing a value of exposure time and an ISO value when the percentage value is greater than or equal to the upper limit of the preset percentage threshold such that the reduced percentage value in the image is within the range of the preset percentage threshold.

Beneficial effects include that the parameter needing to be set in the slow shutter photographing mode is set to adjust the overall brightness of the image, and the value of the exposure time and the ISO value are reduced to avoid overexposure of the obtained target image.

Further, dividing each frame of image of the photographed object into a light trail region and a background light source region according to a first preset brightness value includes dividing each frame of image of the photographed object into the light trail region and the background light source region according to the first preset brightness value, where the light trail region is a region in which a difference exists between the frames of images at a same pixel location and a brightness value is greater than or equal to the first preset brightness value, and the background light source region is a region in which no difference exists between the frames of images at a same pixel location and a brightness value is greater than or equal to the first preset brightness value.

Beneficial effects include that each frame of image is divided into the light trail region and the background light source region such that the photographing apparatus can separately perform particular image processing on the regions.

Figure 4:
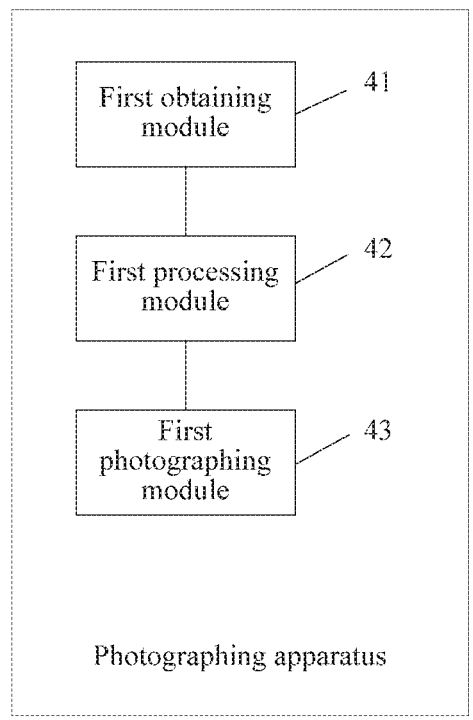
FIG. 4 is a schematic structural diagram of Embodiment 1 of a photographing apparatus according to an embodiment of the present application.

As shown in FIG. 4. FIG. 4 is a schematic structural diagram of Embodiment 1 of a photographing apparatus according to an embodiment of the present application. The photographing apparatus includes a first obtaining module 41, a first processing module 42, and a first photographing module 43.

The first obtaining module 41 is configured to obtain an instruction of entering a slow shutter photographing mode. Further, a processor (not shown) of the photographing apparatus obtains, using an input device (not shown), the instruction of entering the slow shutter photographing mode that is input or selected by a user.

The first obtaining module 41 is further configured to continuously obtain frames of images of a photographed object after the photographing apparatus enters the slow shutter photographing mode according to the instruction of entering the slow shutter photographing mode. Further, after entering the slow shutter photographing mode, the processor of the photographing apparatus obtains the frames of images of the photographed object at different moments using a camera (not shown), and displays the frames of images on a screen of the photographing apparatus.

The first obtaining module 41 is further configured to obtain brightness of the frames of images of the photographed object to adjust a value of a parameter needing to be set in the slow shutter photographing mode.

The first processing module 42 is configured to adjust, according to the brightness of the frames of images of the photographed object, the value of the parameter needing to be set in the slow shutter photographing mode in order to avoid overexposure of a target image after the photographing. Further, after the brightness of the frames of images is obtained, statistics is collected on a percentage of a pixel whose brightness is greater than or equal to a particular brightness value in all pixels, and the percentage value is adjusted to a particular threshold to adjust overall brightness of the target image.

The first processing module 42 is configured to divide each frame of image of the photographed object into a light trail region, a background light source region, and a non-light-source region according to a first preset brightness value, where the light trail region is a region formed by a moving object of the photographed object during movement, and includes a trail formed by waterfalls, a shooting star, or fireworks, the background light source is another light source region other than the light trail region of the photographed object, for example, a street lamp or stars, and the non-light-source region is a region in which there is no light source. A value of the first preset brightness value is about 210.

The first processing module 42 is further configured to merge the light trail regions of the frames of images of the photographed object, and set a merged light trail region as a light trail region of the target image.

Further, brightness of pixels at a same location in the light trail regions of the frames of images is added, and the added brightness is used as brightness of the merged light trail region. Alternatively, brightness of pixels at a same location in the light trail regions of some of the frames of images is added, and the added brightness is used as brightness of the merged light trail region.

The first processing module 42 is further configured to set the background light source regions of one or more of the frames of images of the photographed object as a background light source region of the target image to avoid overexposure of the background light source region of the target image. Further, the background light source region of any one of the frames of images of the photographed object is used as the background light source region of the target image after the photographing to avoid overexposure of the background light source region of the target image after the photographing. Alternatively, when the background light source region of the target image after the photographing is not overexposed, the background light source regions of multiple frames of images of the frames of images of the photographed object are used as the background light source region of the target image after the photographing.

The first processing module 42 is further configured to merge the non-light-source regions of one or more of the frames of images of the photographed object, and set a merged non-light-source region as a non-light-source region of the target image to enhance brightness of the merged non-light-source region of the target image and avoid overexposure.

Further, the non-light-source regions of the first N frames of images obtained chronologically in the frames of images of the photographed object are merged and the merged non-light-source region is used as the non-light-source region of the target image to enhance brightness of the merged non-light-source region of the target image and avoid overexposure, where a value of N is a positive integer. Brightness of pixels at a same location in the non-light-source regions of the first N frames of images is added, and the added brightness is used as brightness of the merged light trail region, to enhance the brightness, present more details of the non-light-source region of the image, and avoid overexposure. Alternatively, the non-light-source region of one of the frames of images of the photographed object is merged and is used as the non-light-source region of the target image to enhance the brightness of the merged non-light-source region of the target image and avoid overexposure. Alternatively, when the non-light-source region of the target image after the photographing is not overexposed, the non-light-source regions of any multiple frames of images of the frames of images of the photographed object are merged and the merged non-light-source region is used as the non-light-source region of the target image.

The first photographing module 43 is configured to store the target image after obtaining a photographing instruction. Further, for the target image whose light trail region, background light source region, and non-light-source region have been processed, the photographing apparatus stores the target image into a memory after obtaining an instruction of pressing a shutter and executing a photographing action. Alternatively, the target image including the light trail region, the background light source region, and the non-light-source region that have been processed by the processor is first displayed on the screen of the photographing apparatus for preview, and after an instruction of pressing a shutter and executing a photographing action is obtained, the image that is previewed on the screen and is processed is stored into a storage medium.

Beneficial effects include that each frame of image of a photographed object is divided into a light trail region, a background light source region, and a non-light-source region according to a first preset brightness value, and processing of different brightness values is performed for different regions such that a user not experienced in photographing can obtain a high-quality image of a moving trail of a light source through photographing, and the obtained image is of high-quality sharpness and exposure, and can also effectively reflect the moving trail of the light source. For example, images including effects of a light-trail pattern formed after a handheld light source is moved, a glimpse of fireworks display that easily disappears, and a silky water effect brought by magnificent waterfalls can be obtained by means of photographing.

The first processing module 42 is further configured to obtain, according to the brightness, a quantity of pixels whose brightness is greater than or equal to a second preset brightness value in an image of the photographed object if the value of the parameter needing to be set in the slow shutter photographing mode is not directly obtained, after the brightness of the frames of images of the photographed object is obtained, calculate, according to the quantity of the pixels whose brightness is greater than or equal to the second preset brightness value and a total quantity of pixels in the image of the photographed object, a percentage value of the pixel whose brightness is greater than or equal to the second preset brightness value, and adjust the value of the parameter needing to be set in the slow shutter photographing mode to reduce the percentage value such that the reduced percentage value in the image is within a range of the preset percentage threshold when the percentage value is greater than or equal to an upper limit of a preset percentage threshold.

Beneficial effects include that when the user does not enter the value of the parameter needing to be set for a slow shutter, the percentage value of the pixel whose brightness is greater than or equal to the second preset brightness value is adjusted to adjust overall brightness of the image and avoid overexposure of the obtained target image. This is an auto-adjustment mode of the photographing apparatus.

Further, the first processing module 42 is further configured to adjust, according to the directly obtained value of the parameter, the parameter needing to be set in the slow shutter photographing mode if the value of the parameter needing to be set in the slow shutter photographing mode is directly obtained, where the value of the parameter needing to be set in the slow shutter photographing mode is set by the user.

Beneficial effects include that when the user-entered value of the parameter needing to be set for the slow shutter is directly obtained, the parameter needing to be set in the slow shutter photographing mode is directly set to adjust the overall brightness of the image and avoid overexposure of the obtained target image. This is a manual adjustment mode.

Further, the first processing module 42 is further configured to perform brightness smoothing process on boundaries of the light trail region, the background light source region, and the non-light-source region.

Beneficial effects include that brightness smoothing process is performed on the boundaries such that the brightness of the image changes gently.

Further, when the percentage value is greater than or equal to the upper limit of the preset percentage threshold, when adjusting the value of the parameter needing to be set in the slow shutter photographing mode to reduce the percentage value such that the reduced percentage value in the image after the photographing is within the range of the preset percentage threshold, the first processing module 42 is further configured to reduce a value of exposure time and an ISO value when the percentage value is greater than or equal to the upper limit of the preset percentage threshold such that the reduced percentage value in the image after the photographing is within the range of the preset percentage threshold.

Beneficial effects include that the parameter needing to be set in the slow shutter photographing mode is set to adjust the overall brightness of the image, and the value of the exposure time and the ISO value are reduced to avoid overexposure of the obtained target image.

Further, when dividing each frame of image of the photographed object into the light trail region, the background light source region, and the non-light-source region according to the first preset brightness value, the first processing module 42 is further configured to divide each frame of image of the photographed object into the light trail region, the background light source region, and the non-light-source region according to a difference degree of the images at a same pixel location in the frames of images of the photographed object and the first preset brightness value, where the difference degree refers to whether the images at the same pixel location in the frames of images of the photographed object are different.

Further, when dividing each frame of image of the photographed object into the light trail region, the background light source region, and the non-light-source region according to the first preset brightness value, the first processing module 42 is further configured to divide each frame of image of the photographed object into the light trail region, the background light source region, and the non-light-source region according to the first preset brightness value (about 210), where the light trail region is a region in which a difference exists between the frames of images at a same pixel location and a brightness value is greater than or equal to the first preset brightness value (about 210), the background light source region is a region in which no difference exists between the frames of images at a same pixel location and a brightness value is greater than or equal to the first preset brightness value (about 210), and the non-light-source region is a region in which no difference exists between the frames of images at a same pixel location and a brightness value is less than the first preset brightness value (about 210).

Beneficial effects include that each frame of image is divided into the light trail region, the background light source region, and the non-light-source region such that the photographing apparatus can separately perform particular image processing on the regions.

Further, when merging the non-light-source regions of one or more of the frames of images of the photographed object, and setting the merged non-light-source region as the non-light-source region of the target image to enhance the brightness of the merged non-light-source region of the target image and avoid overexposure, the first processing module 42 is further configured to merge the non-light-source regions of the first N frames of images obtained chronologically in the frames of images of the photographed object, add a brightness value C of the merged non-light-source region and a brightness value of the non-light-source region of the $(N+1)^{th}$ frame obtained chronologically to obtain a brightness value D, and set the merged non-light-source region of the first N frames of images as the non-light-source region of the target image if the brightness value D is greater than or equal to the first preset brightness value, where N is a positive integer.

Beneficial effects include selecting frames that are used to form the non-light-source region of the target image by merging enhances the brightness of the non-light-source region of the image obtained through photographing and avoids overexposure such that details of the non-light-source region of the image can be presented more effectively.

Figure 5:
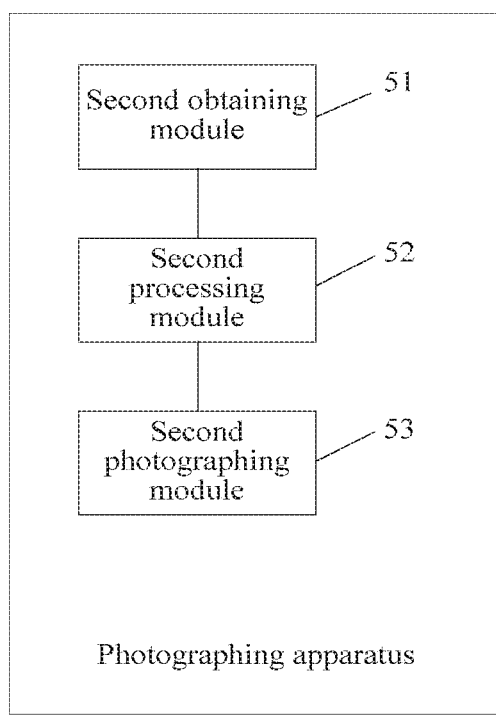
FIG. 5 is a schematic structural diagram of Embodiment 2 of a photographing apparatus according to an embodiment of the present application.

As shown in FIG. 5, FIG. 5 is a schematic structural diagram of Embodiment 2 of a photographing apparatus according to an embodiment of the present application. The photographing apparatus includes a second obtaining module 51, a second processing module 52, and a second photographing module 53.

The second obtaining module 51 is configured to obtain an instruction of entering a slow shutter photographing mode. Further, a processor (not shown) of the photographing apparatus obtains, using an input device (not shown), the instruction of entering the slow shutter photographing mode that is input or selected by a user.

The second obtaining module 51 is further configured to continuously obtain frames of images of a photographed object after the photographing apparatus enters the slow shutter photographing mode according to the instruction of entering the slow shutter photographing mode. Further, after entering the slow shutter photographing mode, the processor of the photographing apparatus obtains the frames of images of the photographed object at different moments using a camera (not shown), and displays the frames of images on a screen of the photographing apparatus.

The second obtaining module 51 is further configured to obtain brightness of the frames of images of the photographed object to adjust a value of a parameter needing to be set in the slow shutter photographing mode.

The second processing module 52 is configured to adjust, according to the brightness of the frames of images of the photographed object, the value of the parameter needing to be set in the slow shutter photographing mode in order to avoid overexposure of a target image after the photographing. Further, after the brightness of the frames of images is obtained, statistics is collected on a percentage of a pixel whose brightness is greater than or equal to a particular brightness value in all pixels, and the percentage value is adjusted to a particular threshold, to adjust overall brightness of the target image.

The second processing module 52 is configured to divide each frame of image of the photographed object into a light trail region and a background light source region according to a first preset brightness value, where the light trail region is a region formed by a moving object of the photographed object during movement, and includes a trail formed by waterfalls, a shooting star, or fireworks, and the background light source is another light source region other than the light trail region of the photographed object, for example, a street lamp or stars. A value of the first preset brightness value is about 210.

The second processing module 52 is further configured to merge the light trail regions of the frames of images of the photographed object, and use a merged light trail region as a light trail region of the target image. Further, brightness of pixels at a same location in the light trail regions of the frames of images is added, and the added brightness is used as brightness of the merged light trail region. Alternatively, brightness of pixels at a same location in the light trail regions of some of the frames of images is added, and the added brightness is used as brightness of the merged light trail region.

The second processing module 52 is further configured to set the background light source regions of one or more of the frames of images of the photographed object as a background light source region of the target image to avoid overexposure of the background light source region of the target image. Further, the background light source region of any one of the frames of images of the photographed object is used as the background light source region of the target image after the photographing to avoid overexposure of the background light source region of the target image after the photographing. Alternatively, when the background light source region of the target image after photographing is not overexposed, the background light source regions of multiple frames of images of the frames of images of the photographed object are used as the background light source region of the target image after the photographing.

The second photographing module 53 stores the target image after obtaining a photographing instruction. Further, for the target image whose light trail region, background light source region, and non-light-source region have been processed, the photographing apparatus stores the target image into a memory after obtaining an instruction of pressing a shutter and executing a photographing action. Alternatively, the target image including the light trail region, the background light source region, and the non-light-source region that have been processed by the processor is first displayed on the screen of the photographing apparatus for preview, and after an instruction of pressing a shutter and executing a photographing action is obtained, the image that is previewed on the screen and is processed is stored into a storage medium. Beneficial effects include that each frame of image of a photographed object is divided into light trail region and background light source region according to a first preset brightness value, and processing of different brightness values is performed for the two regions such that a user not experienced in photographing can obtain a high-quality image of a moving trail of a light source through photographing, and the obtained image is of high-quality sharpness and exposure, and can also effectively reflect the moving trail of the light source. For example, images including effects of a light-trail pattern formed after a handheld light source is moved, a glimpse of fireworks display that easily disappears, and a silky water effect brought by magnificent waterfalls can be obtained by means of photographing.

Further, the second processing module 52 is further configured to obtain, according to the brightness, a quantity of pixels whose brightness is greater than or equal to a second preset brightness value in an image of the photographed object if the value of the parameter needing to be set in the slow shutter photographing mode is not directly obtained, after the brightness of the frames of images of the photographed object is obtained, calculate, according to the quantity of the pixels whose brightness is greater than or equal to the second preset brightness value and a total quantity of pixels in the image of the photographed object, a percentage value of the pixel whose brightness is greater than or equal to the second preset brightness value, and adjust the value of the parameter needing to be set in the slow shutter photographing mode to reduce the percentage value such that the reduced percentage value in the image is within a range of the preset percentage threshold when the percentage value is greater than or equal to an upper limit of a preset percentage threshold.

Beneficial effects include that when the user does not enter the value of the parameter needing to be set for a slow shutter, the percentage value of the pixel whose brightness is greater than or equal to the second preset brightness value is adjusted to adjust overall brightness of the image and avoid overexposure of the obtained target image. This is an auto-adjustment mode of the photographing apparatus.

The second processing module 52 is further configured to adjust, according to the directly obtained value of the parameter, the parameter needing to be set in the slow shutter photographing mode if the value of the parameter needing to be set in the slow shutter photographing mode is directly obtained, where the value of the parameter needing to be set in the slow shutter photographing mode is set by the user.

Beneficial effects include that when the user-entered value of the parameter needing to be set for the slow shutter is directly obtained, the parameter needing to be set in the slow shutter photographing mode is directly set to adjust the overall brightness of the image and avoid overexposure of the obtained target image. This is a manual adjustment mode.

The second processing module 52 is further configured to perform brightness smoothing process on boundaries of the light trail region and the non-light-source region.

Beneficial effects include that brightness smoothing process is performed on the boundaries such that the brightness of the image changes gently.

Further, when the percentage value is greater than or equal to the upper limit of the preset percentage threshold, when adjusting the value of the parameter needing to be set in the slow shutter photographing mode to reduce the percentage value such that the reduced percentage value in the image after the photographing is within the range of the preset percentage threshold, the second processing module 52 is further configured to reduce a value of exposure time and an ISO value when the percentage value is greater than or equal to the upper limit of the preset percentage threshold such that the reduced percentage value in the image after the photographing is within the range of the preset percentage threshold.

Beneficial effects include that the parameter needing to be set in the slow shutter photographing mode is set to adjust the overall brightness of the image, and the value of the exposure time and the ISO value are reduced to avoid overexposure of the obtained target image.

Further, when dividing each frame of image of the photographed object into the light trail region and the background light source region according to the first preset brightness value, the second processing module 52 is further configured to divide each frame of image of the photographed object into the light trail region and the background light source region according to the first preset brightness value (about 210), where the light trail region is a region in which a difference exists between the frames of images at a same pixel location and a brightness value is greater than or equal to the first preset brightness value (about 210), and the background light source region is a region in which no difference exists between the frames of images at a same pixel location and a brightness value is greater than or equal to the first preset brightness value (about 210).

Beneficial effects include that each frame of image is divided into the light trail region and the background light source region such that the photographing apparatus can separately perform particular image processing on the regions.

Figure 6:
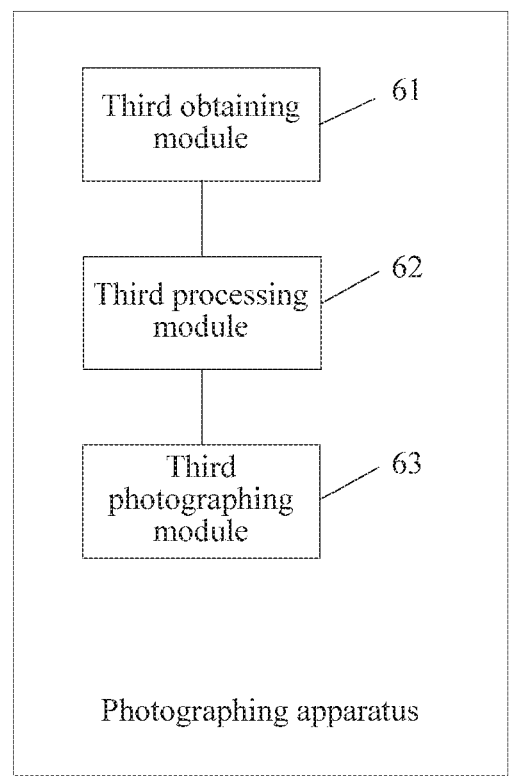
FIG. 6 is a schematic structural diagram of Embodiment 3 of a photographing apparatus according to an embodiment of the present application.

As shown in FIG. 6. FIG. 6 is a schematic structural diagram of Embodiment 3 of a photographing apparatus according to an embodiment of the present application. The photographing apparatus includes a third obtaining module 61, a third processing module 62, and a third photographing module 63.

The third obtaining module 61 is configured to obtain an instruction of entering a slow shutter photographing mode. Further, a processor (not shown) of the photographing apparatus obtains, using an input device (not shown), the instruction of entering the slow shutter photographing mode that is input or selected by a user.

The third obtaining module 61 is further configured to continuously obtain frames of images of a photographed object after the photographing apparatus enters the slow shutter photographing mode according to the instruction of entering the slow shutter photographing mode. Further, after entering the slow shutter photographing mode, the processor of the photographing apparatus obtains the frames of images of the photographed object at different moments using a camera (not shown), and displays the frames of images on a screen of the photographing apparatus.

The third obtaining module 61 is further configured to obtain brightness of the frames of images of the photographed object to adjust a value of a parameter needing to be set in the slow shutter photographing mode.

The third processing module 62 is configured to adjust, according to the brightness of the frames of images of the photographed object, the value of the parameter needing to be set in the slow shutter photographing mode in order to avoid overexposure of a target image after the photographing. Further, after the brightness of the frames of images is obtained, statistics is collected on a percentage of a pixel whose brightness is greater than or equal to a particular brightness value in all pixels, and the percentage value is adjusted to a particular threshold to adjust overall brightness of the target image.

The third processing module 62 divides each frame of image of the photographed object into a light trail region and a non-light-source region according to a first preset brightness value, where the light trail region is a region formed by a moving object of the photographed object during movement, and includes a trail formed by waterfalls, a shooting star, or fireworks, and the non-light-source region is a region in which there is no light source.

The third processing module 62 is further configured to merge the light trail regions of the frames of images of the photographed object, and set a merged light trail region as a light trail region of the target image. Further, brightness of pixels at a same location in the light trail regions of the frames of images is added, and the added brightness is used as brightness of the merged light trail region. Alternatively, brightness of pixels at a same location in the light trail regions of some of the frames of images is added, and the added brightness is used as brightness of the merged light trail region.

The third processing module 62 is further configured to merge the non-light-source regions of one or more of the frames of images of the photographed object, and set a merged non-light-source region as a non-light-source region of the target image to enhance brightness of the merged non-light-source region of the target image and avoid overexposure.

Further, the non-light-source regions of the first N frames of images obtained chronologically in the frames of images of the photographed object are merged and the merged non-light-source region is used as the non-light-source region of the target image to enhance brightness of the merged non-light-source region of the target image and avoid overexposure, where a value of N is a positive integer. Brightness of pixels at a same location in the non-light-source regions of the first N frames of images is added, and the added brightness is used as brightness of the merged light trail region to enhance the brightness, present more details of the non-light-source region of the image, and avoid overexposure. Alternatively, the non-light-source region of one of the frames of images of the photographed object is merged and is used as the non-light-source region of the target image to enhance brightness of the merged non-light-source region of the target image and avoid overexposure. Alternatively, when the non-light-source region of the target image after the photographing is not overexposed, the non-light-source regions of any multiple frames of images of the frames of images of the photographed object are merged and the merged non-light-source region is used as the non-light-source region of the target image.

The third photographing module 63 stores the target image after obtaining a photographing instruction. Further, for the target image whose light trail region and non-light-source region have been processed, the photographing apparatus stores the target image into a memory after obtaining an instruction of pressing a shutter and executing a photographing action. Alternatively, the target image including the light trail region and the non-light-source region that have been processed by the processor is first displayed on the screen of the photographing apparatus for preview, and after an instruction of pressing a shutter and executing a photographing action is obtained, the image that is previewed on the screen and is processed is stored into a storage medium. Beneficial effects include that each frame of image of a photographed object is divided into a light trail region and a non-light-source region according to a first preset brightness value, and processing of different brightness values is performed for the two regions such that a user not experienced in photographing can obtain a high-quality image of a moving trail of a light source through photographing, and the obtained image is of high-quality sharpness and exposure, and can also effectively reflect the moving trail of the light source. For example, images including effects of a light-trail pattern formed after a handheld light source is moved, a glimpse of fireworks display that easily disappears, and a silky water effect brought by magnificent waterfalls can be obtained by means of photographing.

The third processing module 62 is further configured to obtain, according to the brightness, a quantity of pixels whose brightness is greater than or equal to a second preset brightness value in an image of the photographed object if the value of the parameter needing to be set in the slow shutter photographing mode is not directly obtained, after the brightness of the frames of images of the photographed object is obtained, calculate, according to the quantity of the pixels whose brightness is greater than or equal to the second preset brightness value and a total quantity of pixels in the image of the photographed object, a percentage value of the pixel whose brightness is greater than or equal to the second preset brightness value, and adjust the value of the parameter needing to be set in the slow shutter photographing mode to reduce the percentage value such that the reduced percentage value in the image is within a range of the preset percentage threshold when the percentage value is greater than or equal to an upper limit of a preset percentage threshold.

Beneficial effects include that when the user does not enter the value of the parameter needing to be set for a slow shutter, the percentage value of the pixel whose brightness is greater than or equal to the second preset brightness value is adjusted to adjust overall brightness of the image and avoid overexposure of the obtained target image. This is an auto-adjustment mode of the photographing apparatus.

Further, the third processing module 62 is further configured to adjust, according to the directly obtained value of the parameter, the parameter needing to be set in the slow shutter photographing mode if the value of the parameter needing to be set in the slow shutter photographing mode is directly obtained, where the value of the parameter needing to be set in the slow shutter photographing mode is set by a user.

Beneficial effects include that when the user-entered value of the parameter needing to be set for the slow shutter is directly obtained, the parameter needing to be set in the slow shutter photographing mode is directly set to adjust the overall brightness of the image and avoid overexposure of the obtained target image. This is a manual adjustment mode.

The third processing module 62 is further configured to perform brightness smoothing process on boundaries of the light trail region and the background light source region.

Beneficial effects include that brightness smoothing process is performed on the boundaries such that the brightness of the image changes gently.

Further, when the percentage value is greater than or equal to the upper limit of the preset percentage threshold, when adjusting the value of the parameter needing to be set in the slow shutter photographing mode to reduce the percentage value such that the reduced percentage value in the image after the photographing is within the range of the preset percentage threshold, the third processing module 62 is further configured to reduce a value of exposure time and an ISO value when the percentage value is greater than or equal to the upper limit of the preset percentage threshold (any percentage from 20% to 30%) such that the reduced percentage value in the image after the photographing is within the range of the preset percentage threshold.

Beneficial effects include that parameter needing to be set in the slow shutter photographing mode is set to adjust the overall brightness of the image, and the value of the exposure time and the ISO value are reduced to avoid overexposure of the obtained target image.

Further, when dividing each frame of image of the photographed object into the light trail region and the non-light-source region according to the first preset brightness value, the third processing module 62 is further configured to divide each frame of image of the photographed object into the light trail region and the non-light-source region according to the first preset brightness value (about 210), where the light trail region is a region in which a difference exists between the frames of images at a same pixel location and a brightness value is greater than or equal to the first preset brightness value (about 210), and the non-light-source region is a region in which no difference exists between the frames of images at a same pixel location and a brightness value is less than the first preset brightness value (about 210).

Beneficial effects include that each frame of image is divided into the light trail region and the non-light-source region such that the photographing apparatus can separately perform particular image processing on the regions.

When merging the non-light-source regions of one or more of the frames of images of the photographed object, and setting the merged non-light-source region as the non-light-source region of the target image to enhance the brightness of the merged non-light-source region of the target image and avoid overexposure, the third processing module 62 is further configured to merge the non-light-source regions of the first N frames of images obtained chronologically in the frames of images of the photographed object, add a brightness value C of the merged non-light-source region and a brightness value of the non-light-source region of the $(N+1)^{th}$ frame obtained chronologically to obtain a brightness value D, and set the merged non-light-source region of the first N frames of images as the non-light-source region of the target image if the brightness value D is greater than or equal to the first preset brightness value, where N is a positive integer.

Further, the non-light-source regions of the first N frames of images obtained chronologically in the frames of images of the photographed object are merged and the merged non-light-source region is used as the non-light-source region of the target image to enhance brightness of the merged non-light-source region of the target image and avoid overexposure, where a value of N is a positive integer. Brightness of pixels at a same location in the non-light-source regions of the first N frames of images is added, and the added brightness is used as brightness of the merged non-light-source region to enhance the brightness, present more details of the non-light-source region of the image, and avoid overexposure. Alternatively, the non-light-source region of one of the frames of images of the photographed object is merged and is used as the non-light-source region of the target image to enhance brightness of the merged non-light-source region of the target image and avoid overexposure. Alternatively, when the non-light-source region of the target image after the photographing is not overexposed, the non-light-source regions of any multiple frames of images of the frames of images of the photographed object are merged and the merged non-light-source region is used as the non-light-source region of the target image.

Figure 7:
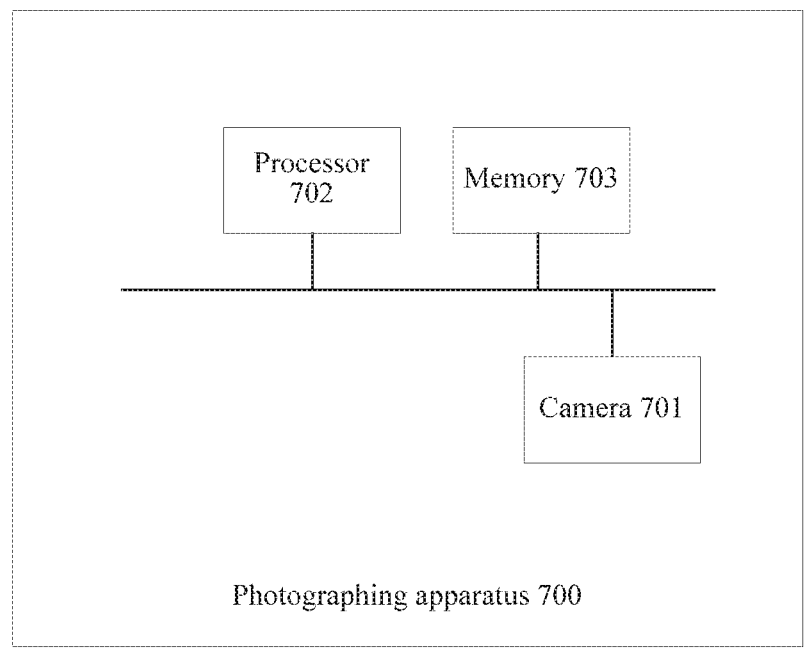
FIG. 7 is a schematic structural diagram of Embodiment 4 of a photographing apparatus according to an embodiment of the present application.

As shown in FIG. 7. FIG. 7 is a schematic structural diagram of Embodiment 4 of a photographing apparatus 700 according to an embodiment of the present application. The photographing apparatus 700 includes a camera 701 configured to continuously obtain frames of images of a photographed object after the photographing apparatus enters a slow shutter photographing mode according to an instruction of entering the slow shutter photographing mode, a processor 702 configured to divide each frame of image of the photographed object into a light trail region, a background light source region, and a non-light-source region according to a first preset brightness value, where the processor 702 is further configured to merge the light trail regions of the frames of images of the photographed object, and set a merged light trail region as a light trail region of a target image, and the processor 702 is further configured to set the background light source regions of one or more of the frames of images of the photographed object as a background light source region of the target image to avoid overexposure of the background light source region of the target image, and further configured to merge the non-light-source regions of one or more of the frames of images of the photographed object, and set a merged non-light-source region as a non-light-source region of the target image to enhance brightness of the merged non-light-source region of the target image and avoid overexposure, and a memory 703 configured to store data, and further, store various image data during photographing and after executing a photographing action.

The foregoing hardware units may transmit data using a data channel.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A photographing method, comprising:
    obtaining an instruction of entering a slow shutter photographing mode;
    entering the slow shutter photographing mode after obtaining the instruction;
    continuously obtaining frames of images of a photographed object after entering the slow shutter photographing mode;
    after continuously obtaining the frames of the images of the photographed object,
        obtaining a brightness of the frames of images of the photographed object; and
        adjusting, according to a value of a parameter needing to be set in the slow shutter photographing mode, the parameter needing to be set in the slow shutter photographing mode when the value of the parameter needing to be set in the slow shutter photographing mode is directly obtained, wherein the value of the parameter needing to be set in the slow shutter photographing mode is set according to the brightness of the frames of images;

dividing, according to a first preset brightness value, each frame of an image of the photographed object into different regions after adjusting the parameter needing to be set in the slow shutter photographing mode, wherein the different regions comprise a light trail region, a background light source region, and a non-light-source region;

performing different brightness values processing based on the different regions to obtain a target image that is not overexposed; and storing the target image after obtaining a photographing instruction.

2. The method of claim 1, wherein after continuously obtaining the frames of images of the photographed object, and before dividing each frame of the image of the photographed object, the method further comprises:

obtaining, according to the brightness of the frames of images of the photographed object, a quantity of pixels having a brightness that is greater than or equal to a second preset brightness value in the image of the photographed object based on the value of the parameter needing to be set in the slow shutter photographing mode not being directly obtained;

calculating, according to the quantity of pixels whose brightness is greater than or equal to the second preset brightness value and a total quantity of pixels in the image of the photographed object, a percentage value of a pixel whose brightness is greater than or equal to the second preset brightness value; and adjusting, based on the percentage value being greater than or equal to an upper limit of a preset percentage threshold, the value of the parameter needing to be set in the slow shutter photographing mode to reduce the percentage value to a reduced percentage value, wherein the reduced percentage value in the image is within a range of the preset percentage threshold.

3. The method of claim 1, wherein dividing each frame of the image of the photographed object comprises dividing each frame of the image of the photographed object into the light trail region, the background light source region, and the non-light-source region according to a difference degree of the images at a same pixel location in the frames of images of the photographed object and the first preset brightness value.

4. The method of claim 1, wherein performing the different brightness values processing based on the different regions comprises:

merging the light trail regions to obtain a merged light trail region;

setting the merged light trail region as a light trail region of the target image;

setting background light source regions of one or more of the frames of images of the photographed object as a background light source region of the target image to avoid overexposure of the background light source region of the target image;

merging one or more non-light-source regions of one or more of the frames of images of the photographed object to obtain a merged non-light-source region; and setting the merged non-light-source region as a non-light-source region of the target image to enhance brightness of the merged non-light-source region of the target image and to avoid overexposure.

5. The method of claim 4, wherein merging the one or more non-light-source regions of one or more of the frames of images of the photographed object, and setting the merged non-light-source region comprises:

merging the one or more non-light-source regions of a first N frames of images obtained chronologically in the frames of images of the photographed object to obtain a merged non-light source region of the first N frames of images, wherein N is a positive integer;

adding a first brightness value of the merged non-light-source region and a second brightness value of the non-light-source region of an $(N+1)^{th}$ frame obtained chronologically to obtain a third brightness value; and setting the merged non-light-source region of the first N frames of images as the non-light-source region of the target image when the third brightness value is greater than or equal to the first preset brightness value.

6. The method of claim 1, wherein the light trail region is a region formed by a moving object of the photographed object during movement, and wherein the background light source region is another light source region other than the light trail region of the photographed object.

7. The method of claim 1, further comprising obtaining, according to the brightness of the frames of images of the photographed object, a quantity of pixels having a brightness that is greater than or equal to a second preset brightness value in the image of the photographed object based on the value of the parameter needing to be set in the slow shutter photographing mode not being directly obtained.

8. A photographing apparatus, comprising:

a memory comprising instructions; and a processor coupled to the memory, wherein the instructions cause the processor to be configured to:

obtain an instruction of entering a slow shutter photographing mode;

continuously obtain, according to the instruction of entering the slow shutter photographing mode, frames of images of a photographed object after the photographing apparatus enters the slow shutter photographing mode;

obtain a brightness of the frames of images of the photographed object;

adjust, according to a value of a parameter needing to be set in the slow shutter photographing mode, the parameter needing to be set in the slow shutter photographing mode when the value of the parameter needing to be set in the slow shutter photographing mode is directly obtained, wherein the value of the parameter needing to be set in the slow shutter photographing mode is set according to the brightness of the frames of images;

divide, according to a first preset brightness value, each frame of an image of the photographed object into different regions, wherein the different regions comprise a light trail region, a background light source region, and a non-light-source region;

perform different brightness values processing based on the different regions to obtain a target image that is not overexposed; and store the target image after obtaining a photographing instruction.

9. The photographing apparatus of claim 8, wherein the instructions further cause the processor to be configured to:

obtain, according to the brightness of the frames of images of the photographed object, a quantity of pixels having a brightness that is greater than or equal to a second preset brightness value in the image of the photographed object when the value of the parameter needing to be set in the slow shutter photographing mode is not directly obtained;

calculate, according to the quantity of pixels whose brightness is greater than or equal to the second preset brightness value and a total quantity of pixels in the image of the photographed object, a percentage value of a pixel whose brightness is greater than or equal to the second preset brightness value; and adjust the value of the parameter needing to be set in the slow shutter photographing mode to reduce the percentage value to a reduced percentage value, wherein the reduced percentage value in the image is within a range of a preset percentage threshold when the percentage value is greater than or equal to an upper limit of the preset percentage threshold.

10. The photographing apparatus of claim 8, wherein the instructions cause the processor to be configured to:

merge the light trail regions to obtain a merged light trail region;

set the merged light trail region as a light trail region of the target image;

set background light source regions of one or more of the frames of images of the photographed object as a background light source region of the target image to avoid overexposure of the background light source region of the target image;

merge one or more non-light-source regions of one or more of the frames of images of the photographed object to obtain a merged non-light-source region; and set the merged non-light-source region as a non-light-source region of the target image to enhance brightness of the merged non-light-source region of the target image and to avoid overexposure.

11. The photographing apparatus according to claim 8, wherein the instructions cause the processor to be configured to divide each frame of the image of the photographed object into the light trail region, the background light source region, and the non-light-source region according to a difference degree of the images at a same pixel location in the frames of images of the photographed object and the first preset brightness value.

12. The photographing apparatus according to claim 8, wherein the instructions cause the processor to be configured to:

merge the one or more non-light-source regions of a first N frames of images obtained chronologically in the frames of images of the photographed object to obtain a merged non-light source region of the first N frames of images, wherein N is a positive integer;

add a first brightness value of the merged non-light-source region and a second brightness value of the non-light-source region of an (N+1)$^{th}$ frame obtained chronologically to obtain a third brightness value; and set the merged non-light-source region of the first N frames of images as the non-light-source region of the target image when the third brightness value is greater than or equal to the first preset brightness value.

13. The photographing apparatus of claim 8, wherein the light trail region is a region formed by a moving object of the photographed object during movement, and wherein the background light source region is another light source region other than the light trail region of the photographed object.

14. The photographing apparatus of claim 8, wherein the instructions further cause the processor to be configured to obtain, according to the brightness of the frames of images of the photographed object, a quantity of pixels having a brightness that is greater than or equal to a second preset brightness value in the image of the photographed object when the value of the parameter needing to be set in the slow shutter photographing mode is not directly obtained.

15. A non-transitory computer readable storage medium having a computer usable program code that when executed by a processor of a computer causes the computer to:

obtain an instruction of entering a slow shutter photographing mode;

continuously obtain, according to the instruction of entering the slow shutter photographing mode, frames of images of a photographed object after the photographing apparatus enters the slow shutter photographing mode;

obtain a brightness of the frames of images of the photographed object;

adjust, according to a value of a parameter needing to be set in the slow shutter photographing mode, the parameter needing to be set in the slow shutter photographing mode when the value of the parameter needing to be set in the slow shutter photographing mode is directly obtained, wherein the value of the parameter needing to be set in the slow shutter photographing mode is set according to the brightness of the frames of images;

divide, according to a first preset brightness value, each frame of an image of the photographed object into different regions, wherein the different regions comprise a light trail region, a background light source region, and a non-light-source region;

perform different brightness values processing based on the different regions to obtain a target image that is not overexposed; and store the target image after obtaining a photographing instruction.

16. The non-transitory computer readable storage medium of claim 15, wherein the computer usable program code further causes the computer to be configured to:

obtain, according to the brightness of the frames of images of the photographed object, a quantity of pixels having a brightness that is greater than or equal to a second preset brightness value in the image of the photographed object when the value of the parameter needing to be set in the slow shutter photographing mode is not directly obtained;

calculate, according to the quantity of pixels whose brightness is greater than or equal to the second preset brightness value and a total quantity of pixels in the image of the photographed object, a percentage value of a pixel whose brightness is greater than or equal to the second preset brightness value; and adjust the value of the parameter needing to be set in the slow shutter photographing mode to reduce the percentage value to a reduced percentage value, wherein the reduced percentage value in the image is within a range of a preset percentage threshold when the percentage value is greater than or equal to an upper limit of the preset percentage threshold.

17. The non-transitory computer readable storage medium of claim 15, wherein the computer usable program code further causes the computer to be configured to:

merge the light trail regions to obtain a merged light trail region;

set the merged light trail region as a light trail region of the target image;

set background light source regions of one or more of the frames of images of the photographed object as a background light source region of the target image to avoid overexposure of the background light source region of the target image;

merge one or more non-light-source regions of one or more of the frames of images of the photographed object to obtain a merged non-light-source region; and set the merged non-light-source region as a non-light-source region of the target image to enhance brightness of the merged non-light-source region of the target image and to avoid overexposure.

18. The non-transitory computer readable storage medium of claim 15, wherein the computer usable program code further causes the computer to be configured to divide each frame of the image of the photographed object into the light trail region, the background light source region, and the non-light-source region according to a difference degree of the images at a same pixel location in the frames of images of the photographed object and the first preset brightness value.

19. The non-transitory computer readable storage medium of claim 15, wherein the computer usable program code further causes the computer to be configured to:

merge the one or more non-light-source regions of a first N frames of images obtained chronologically in the frames of images of the photographed object to obtain a merged non-light source region of the first N frames of images, wherein N is a positive integer;

add a first brightness value of the merged non-light-source region and a second brightness value of the non-light-source region of an $(N+1)^{th}$ frame obtained chronologically to obtain a third brightness value; and set the merged non-light-source region of the first N frames of images as the non-light-source region of the target image when the third brightness value is greater than or equal to the first preset brightness value.

20. The non-transitory computer readable storage medium of claim 15, wherein the computer usable program code further causes the computer to be configured to obtain, according to the brightness of the frames of images of the photographed object, a quantity of pixels having a brightness that is greater than or equal to a second preset brightness value in the image of the photographed object when the value of the parameter needing to be set in the slow shutter photographing mode is not directly obtained.

* * * * *